US009007397B2

(12) United States Patent
Mikawa

(10) Patent No.: US 9,007,397 B2
(45) Date of Patent: Apr. 14, 2015

(54) IMAGE CONTROL APPARATUS, SERVER AND CONTROL METHOD THEREFOR

(75) Inventor: Chiaki Mikawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 403 days.

(21) Appl. No.: 13/354,682

(22) Filed: Jan. 20, 2012

(65) Prior Publication Data

US 2012/0154418 A1 Jun. 21, 2012

Related U.S. Application Data

(63) Continuation-in-part of application No. 13/307,175, filed on Nov. 30, 2011, now abandoned.

(30) Foreign Application Priority Data

Dec. 15, 2010 (JP) ................. 2010-279874

(51) Int. Cl.
*G09G 5/00* (2006.01)
*G01C 21/36* (2006.01)
*G09G 5/14* (2006.01)

(52) U.S. Cl.
CPC ............. *G01C 21/3682* (2013.01); *G09G 5/14* (2013.01); *G09G 2340/045* (2013.01); *G09G 2340/12* (2013.01); *G09G 2370/022* (2013.01)

(58) Field of Classification Search
CPC  G09G 5/14; G09G 2340/10; G09G 2340/125
USPC ........................................ 345/619, 581, 660
See application file for complete search history.

(56) References Cited

U.S. PATENT DOCUMENTS

| 2002/0075281 A1* | 6/2002 | Suzuki et al. ................. 345/619 |
| 2003/0078724 A1* | 4/2003 | Kamikawa et al. ........... 701/208 |
| 2009/0140888 A1* | 6/2009 | Tsutsui ...................... 340/995.1 |
| 2010/0049704 A1* | 2/2010 | Sumiya ............................ 707/5 |
| 2010/0073487 A1* | 3/2010 | Sogoh et al. ............... 348/207.1 |

FOREIGN PATENT DOCUMENTS

| CN | 1459742 A | 12/2003 |
| CN | 101783090 A | 7/2010 |
| JP | 2004-343627 | 12/2004 |

OTHER PUBLICATIONS

Apr. 15, 2014 Chinese Office Action that issued in Chinese Patent Application No. 201110438750.3.

* cited by examiner

*Primary Examiner* — Maurice L McDowell, Jr.
(74) *Attorney, Agent, or Firm* — Cowan, Liebowitz & Latman, P.C.

(57) ABSTRACT

An image control apparatus wherein an acquisition unit acquires position information from attribute information of the image, a setting unit sets a display scale of a map when displaying the image on the map, and a generation unit generates display data for displaying the map and the image on a display device using the acquired position information and the set display scale, when the set display scale is lower than a predetermined display scale, the generation unit generates display data in which the image is laid out at a position corresponding to the position information on the map, and when the display scale is higher than the predetermined display scale, the generation unit generates display data in which the image and the map are laid out without laying out the image on the map.

24 Claims, 19 Drawing Sheets

FIG. 11

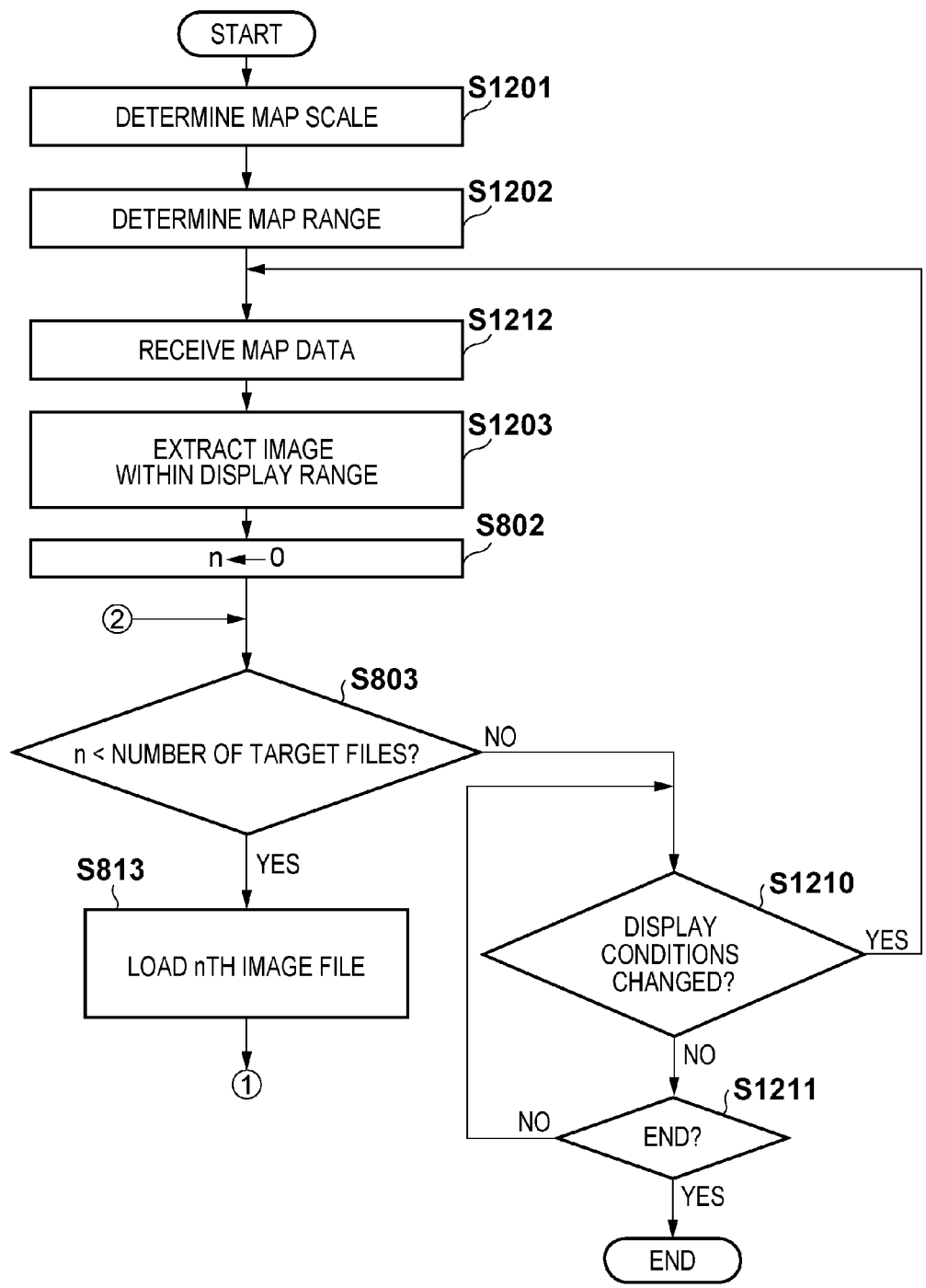
F I G. 12A

IMAGE CONTROL APPARATUS, SERVER AND CONTROL METHOD THEREFOR

CROSS-REFERENCE TO RELATED APPLICATION

This is a continuation-in-part application of U.S. patent application Ser. No. 13/307,175 filed on Nov. 30, 2011, entitled "IMAGE CONTROL APPARATUS, INFORMATION PROCESSING APPARATUS, AND CONTROL METHOD THEREFOR".

BACKGROUND OF THE INVENTION

1. Field of the Invention

The present invention relates to an image control apparatus, server, and control method therefor, particularly to a technique of displaying an image on an electronic map.

2. Description of the Related Art

It has become common to open, to the public, an image which has been shot by a digital camera or portable phone, and laid out at a position corresponding to a shooting location on an electronic map. In such a situation, there has been proposed a digital still camera which automatically deletes information attached to a file to secure private information when transferring the file via a communication network such as the Internet (see, for example, Japanese Patent Laid-Open No. 2004-343627).

In Japanese Patent Laid-Open No. 2004-343627, however, if additional information of a file is deleted, it may become impossible to display any image on a map.

SUMMARY OF THE INVENTION

The present invention has been made in consideration of the aforementioned problems, and realizes a technique of allowing to display an image so as to be able to discriminate its approximate shooting location while protecting the privacy of a photographer.

In order to solve the aforementioned problems, the present invention provides an image control apparatus, comprising: an acquisition unit configured to acquire position information from attribute information of the image; a setting unit configured to set a display scale of a map when displaying the image on the map; and a generation unit configured to generate display data for displaying the map and the image on a display device using the position information acquired by the acquisition unit and the display scale set by the setting unit, wherein when the display scale of the map set by the setting unit is lower than a predetermined display scale, the generation unit generates display data in which the image is laid out at a position corresponding to the position information on the map, and when the display scale of the map is higher than the predetermined display scale, the generation unit generates display data in which the image and the map are laid out without laying out the image on the map.

In order to solve the aforementioned problems, the present invention provides a control method of a display control apparatus, comprising: an acquisition step of acquiring position information from attribute information of the image; a setting step of setting a display scale of a map when displaying the image on the map; and a generation step of generating display data for displaying the map and the image on a display device using the position information acquired by the acquisition step and the display scale set by the setting step, wherein when the display scale of the map set by the setting step is lower than a predetermined display scale, in the generation step display data in which the image is laid out at a position corresponding to the position information on the map is generated, and when the display scale of the map is higher than the predetermined display scale, display data in which the image and the map are laid out without laying out the image on the map is generated.

In order to solve the aforementioned problems, the present invention provides a server which generates display data in which image is laid out on a map and provides the generated display data to a client via a network, comprising: a storage unit configured to store image and attribute information of the image; an acquisition unit configured to acquire position information associated with the image from the attribute information stored in the storage unit; a reception unit configured to receive a designation of a map scale when the image is displayed; and a generation unit configured to generate display data of the map and image using the position information acquired by the acquisition unit and the map scale received by the reception unit, wherein when the map scale received by the reception unit is smaller than a predetermined map scale, the display data is data in which the image is laid out at a position corresponding to the position information on the map, and when the map scale is larger than the predetermined map scale, the display data is data in which the image is not laid out at the position corresponding to the position information on the map.

In order to solve the aforementioned problems, the present invention provides a control method of a server which generates display data in which image is laid out on a map and provides the generated display data to a client via a network, the method comprising: a storage step of storing image and attribute information of the image; an acquisition step of acquiring position information associated with the image from the attribute information stored in the storage step; a reception step of receiving a designation of a map scale when the image is displayed; and a generation step of generating display data of the map and image using the position information acquired by the acquisition step and the map scale received by the reception step, wherein when the map scale received by the reception step is smaller than a predetermined map scale, the display data is data in which the image is laid out at a position corresponding to the position information on the map, and when the map scale is larger than the predetermined map scale, the display data is data in which the image is not laid out at the position corresponding to the position information on the map.

According to the present invention, it is possible to display an image so as to be able to discriminate its approximate shooting location while protecting the privacy of a photographer.

Further features of the present invention will become apparent from the following description of exemplary embodiments (with reference to the attached drawings).

BRIEF DESCRIPTION OF THE DRAWINGS

FIG. 11 is a view showing a user interface example on the image transmission apparatus side according to the second embodiment;

FIGS. 12A and 12B are flowcharts illustrating image reception processing according to the second embodiment;

DESCRIPTION OF THE EMBODIMENTS

Best modes for carrying out the present invention will be described in detail below. Note that the embodiments to be described below are merely examples for implementing the present invention, and should be modified or changed, as needed, in accordance with the configuration of an apparatus to which the present invention is applied and various conditions. The present invention, therefore, is not limited to the following embodiments. Parts of the respective embodiments (to be described later) may be combined as needed.

First Embodiment

An image control apparatus according to this embodiment controls image data obtained by an electronic camera such as a digital still camera or digital video camera which shoots by converting an optical image into electrical image data using a solid-state image sensor. In this embodiment, an image control apparatus which transmits an image shot by a digital still camera to a server computer, and controls information to be distributed on the server computer.

Display scale information indicates a maximum scale set by the user to lay out an image on a map in association with a shooting location. The display scale information is also restriction information indicating a maximum scale when an image is laid out on a map. Methods of determining, holding, and using display scale information will be described in detail later in this embodiment.

Display accuracy information indicates a maximum map accuracy set by the user to lay out an image on a map in association with a shooting location. The map accuracy information is also restriction information indicating a maximum map accuracy when an image is laid out on a map. Methods of determining, holding, and using display accuracy information will be described in detail later in the third embodiment.

System Configuration

Figure 1:
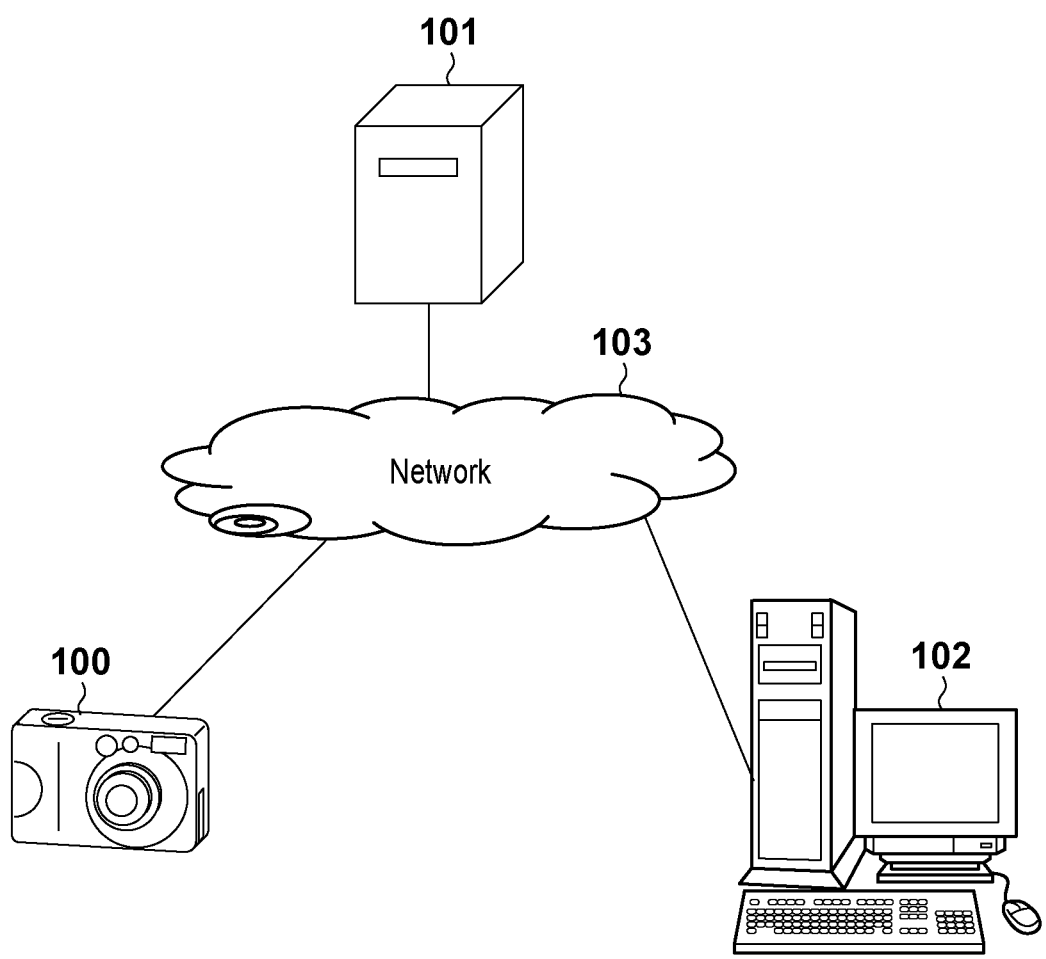
FIG. 1 is a view showing the configuration of an image control system according to an embodiment of the present invention.

The configuration of an image control system of this embodiment will be explained with reference to FIG. 1. Referring to FIG. 1, reference numeral 100 denotes a digital still camera which serves as an image transmission apparatus; 101, a server which serves as an image control apparatus; 102, a client which serves as an image processing apparatus and image reception apparatus; and 103, a computer network via which various apparatuses transmit/receive data to/from each other through a communication circuit.

The digital still camera 100 generates image data in response to a user operation, and records it in a recording medium. The digital still camera 100 generates display scale information in response to a user operation, and transmits it to the server 101 via the computer network 103 in association with the image data. The server 101 controls based on the display scale information whether to lay out the image on a map, and distributes display data including map data and image data to the client via the computer network 103. The client 102 displays the map data and image data which have been received from the server 101. A method of generating display scale information in the digital still camera 100 and a control method in the server will be described in detail later.

Camera Configuration

The configuration of the digital still camera 100 which serves as an image transmission apparatus of this embodiment will be explained with reference to FIGS. 2 and 3.

The digital still camera 100 of this embodiment implements image transmission processing to be described below by executing a predetermined control program, and serves as an image transmission apparatus.

Figure 2:
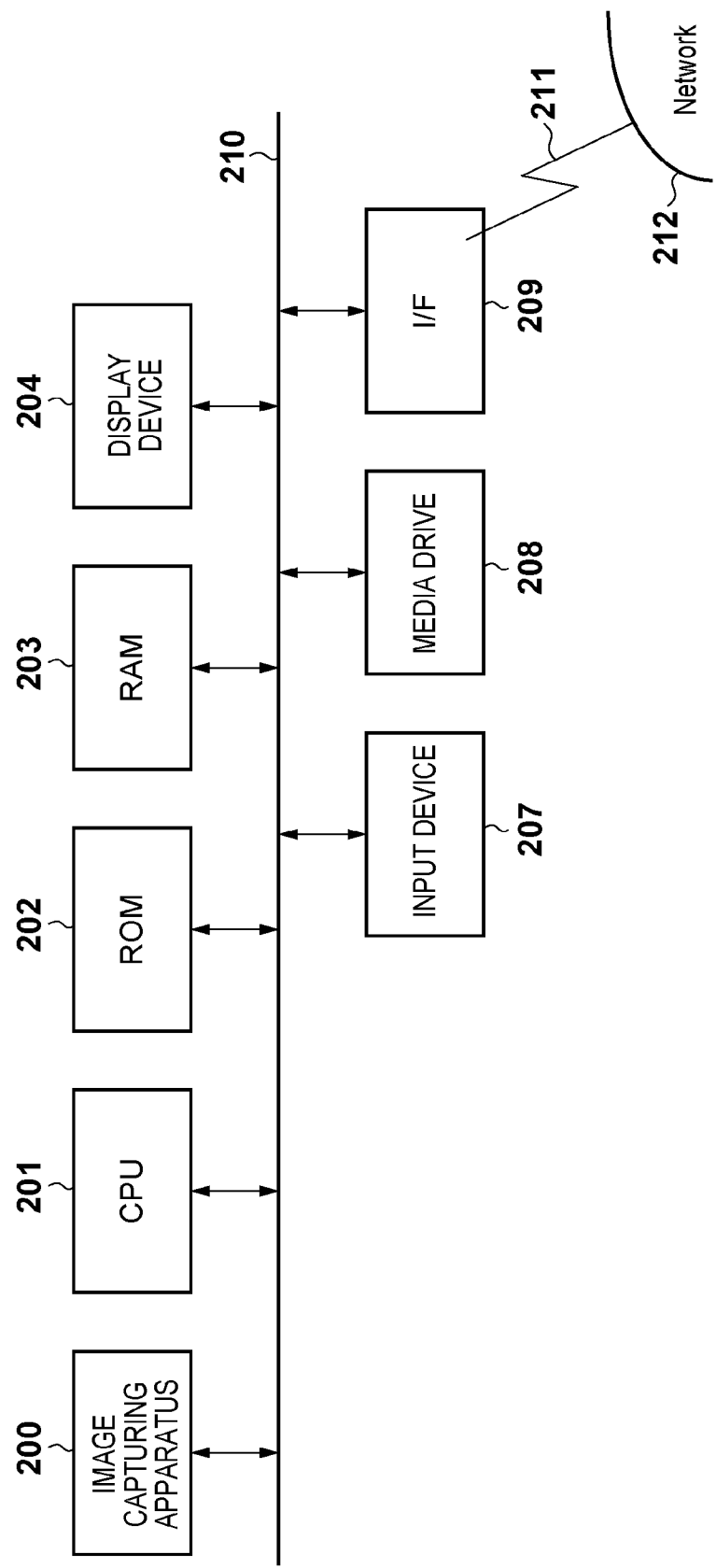
FIG. 2 is a block diagram showing a digital still camera according to the embodiment.

Referring to FIG. 2, reference numeral 200 denotes an image capturing apparatus which generates image data by converting an optical image into electrical image data using a solid-state image sensor; 201, a CPU which controls the digital still camera as a whole; 202, a ROM storing an operation processing procedure (for example, a program such as processing when turning on the digital still camera, and basic input/output processing) of the CPU 201; and 203, a RAM which serves as a main memory for the CPU 201. Various programs including a control program for implementing processing (to be described later) are loaded from the ROM 202 or the like into the RAM 203, and executed by the CPU 201. The RAM 203 also provides a work area to be used by the CPU 201 to execute various processes.

Figure 3:
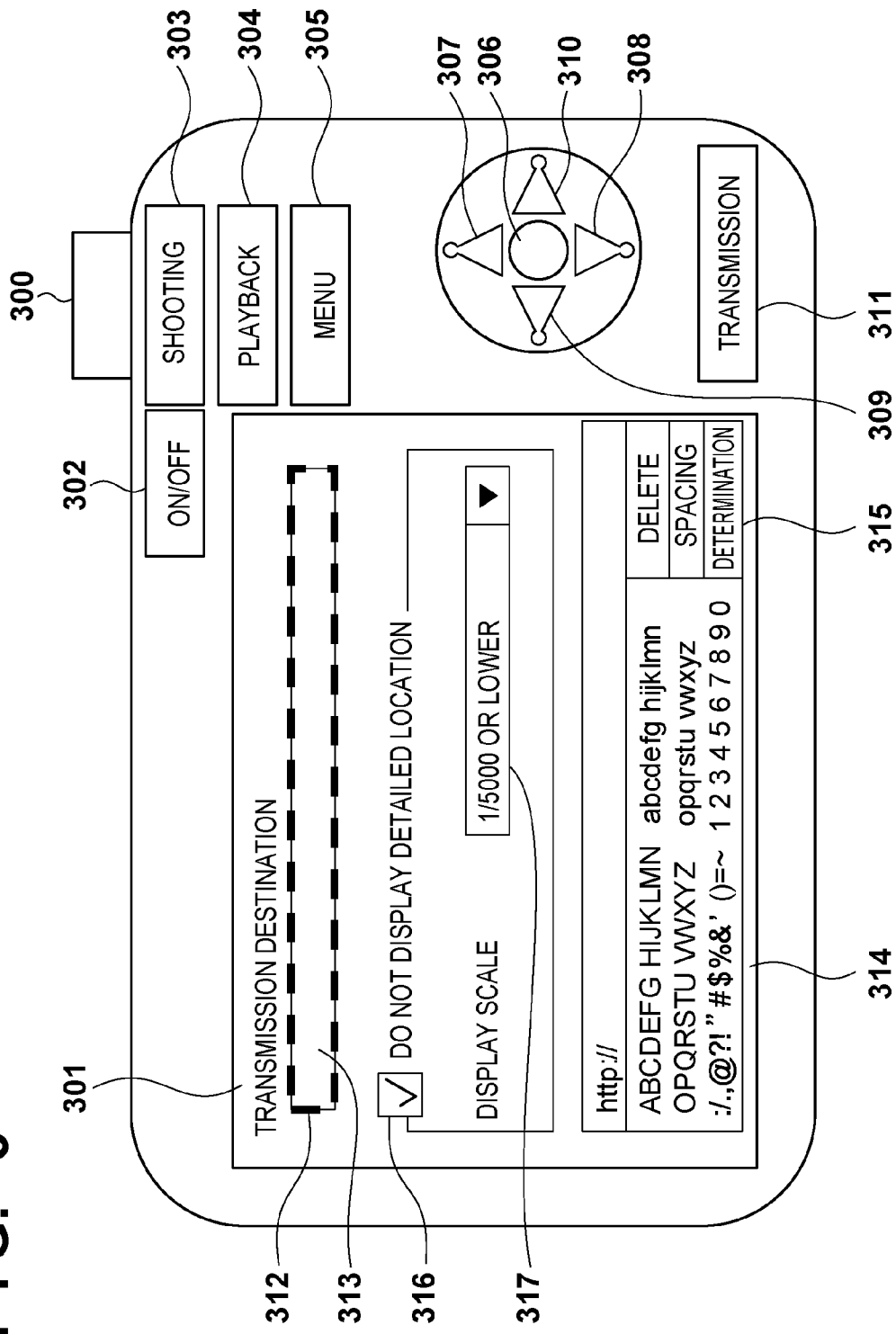
FIG. 3 is a view showing the rear surface of the digital still camera according to the embodiment.

A display device 204 corresponds to a display 301 shown in FIG. 3, and performs various displays under control of the CPU 201. The display device, for example, displays a screen used to make settings for transmission control, and data stored in a storage medium. Reference numeral 207 denotes an input device such as buttons for performing various operations shown in FIG. 3. The buttons will be described in detail later.

Reference numeral 208 denotes a storage medium mounting unit (media drive) which mounts a detachable storage medium to enable to store data and read out the stored data; and 209, a network interface which is connected with a computer network 212 via a communication line 211. The network interface transmits/receives data to/from the server or a personal computer. To acquire position information, the CPU 201 connects to the computer network 212 via the communication line 211, and communicates with the server which calculates position information using a global positioning system (to be referred to as a GPS hereinafter), thereby acquiring the information. The CPU 201 connects to the computer network 212 via the communication line 211, and transmits, to the server, data in the storage medium mounted in the storage medium mounting unit 208.

Reference numeral 210 denotes a system bus (including an address bus, data bus, and control bus) which connects the respective above-described units with each other.

Server Configuration

The configuration of the server 101 which serves as an image control apparatus according to this embodiment will be explained with reference to FIG. 4.

The server of this embodiment implements image control processing to be described below by executing a predetermined control program, and serves as an image control apparatus.

Figure 4:
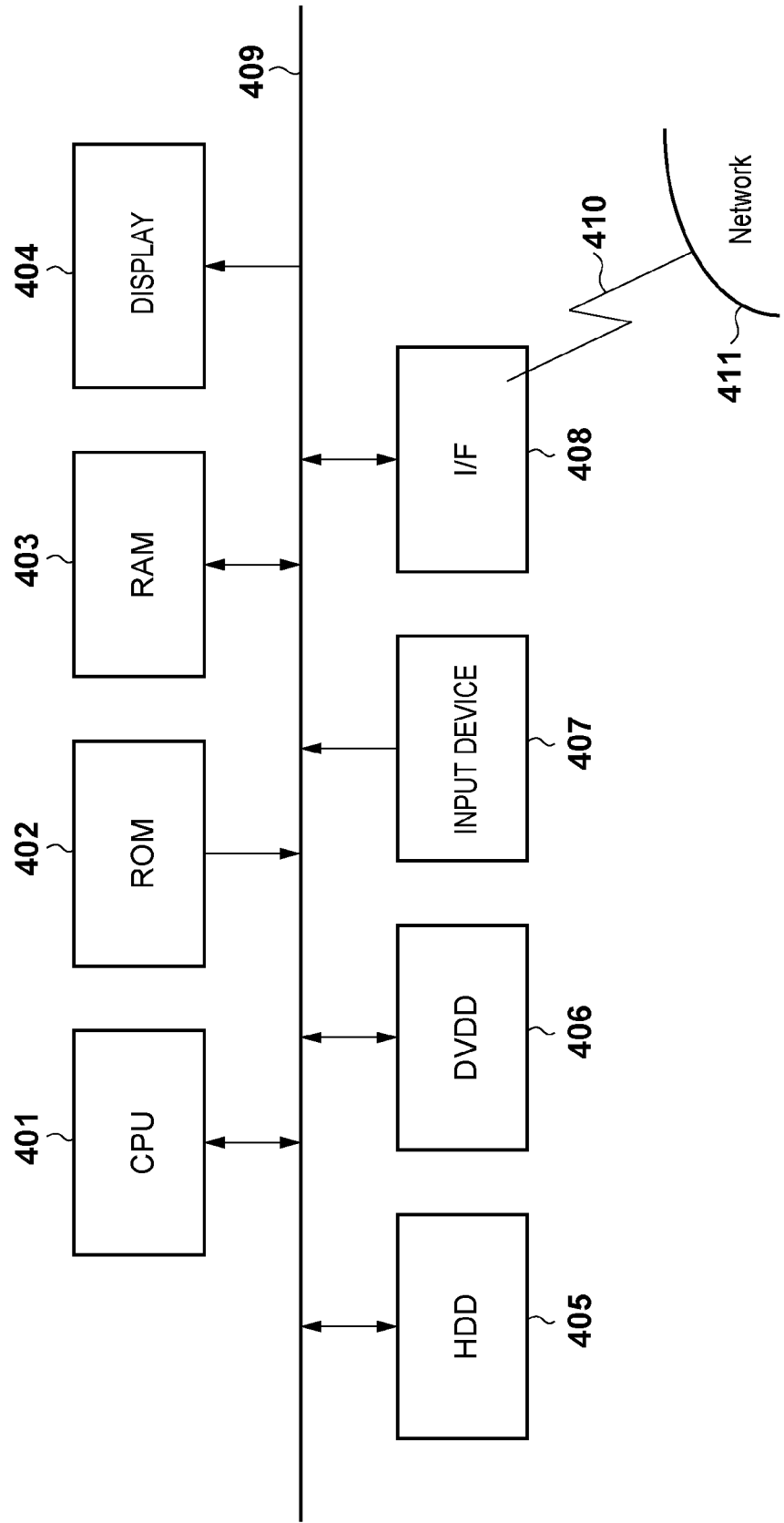
FIG. 4 is a block diagram showing a server according to the embodiment.

Referring to FIG. 4, reference numeral 401 denotes a CPU which controls the apparatus as a whole; 402, a ROM storing an operation processing procedure (for example, a program such as startup processing and basic input/output processing of a computer) of the CPU 401; and 403, a RAM which serves as a main memory for the CPU 401. Various programs including a control program for implementing processing (to be described later) are loaded from a hard disk drive 405 or the like into the RAM 403, and executed by the CPU 401. The RAM 403 also provides a work area to be used by the CPU 401 to execute various processes. Reference numeral 404 denotes a display which performs various displays under the control of the CPU 401.

The hard disk drive (to be referred to as an HDD hereinafter) 405 and a DVD drive (to be referred to as a DVDD hereinafter) 406 are respectively used to store and load an application program, data, a library, and the like. Instead or in addition to the DVDD, an optical (magnetic) disk drive such as a CD-ROM or MO, or a magnetic tape drive such as a tape streamer or DDS may be provided.

Reference numeral 407 denotes an input device such as a keyboard or pointing device; and 408, a network interface which is connected with a computer network 411 via a communication line 410. The network interface 408 transmits/receives data to/from a communicable device. Reference numeral 409 denotes a system bus (including an address bus, data bus, and control bus) which connects the respective above-described units with each other.

Client Configuration

The configuration of the client 102 which serves as an image reception apparatus according to this embodiment will be explained with reference to FIG. 5.

The client 102 of this embodiment implements image reception processing to be described below by executing a predetermined control program, and serves as an image reception apparatus. The configuration of the client 102 is the same as that of the server 101 except for control programs stored in the ROM 402 and hard disk drive 405. Different points from the server 101 will be explained with reference to FIG. 5.

Figure 5:
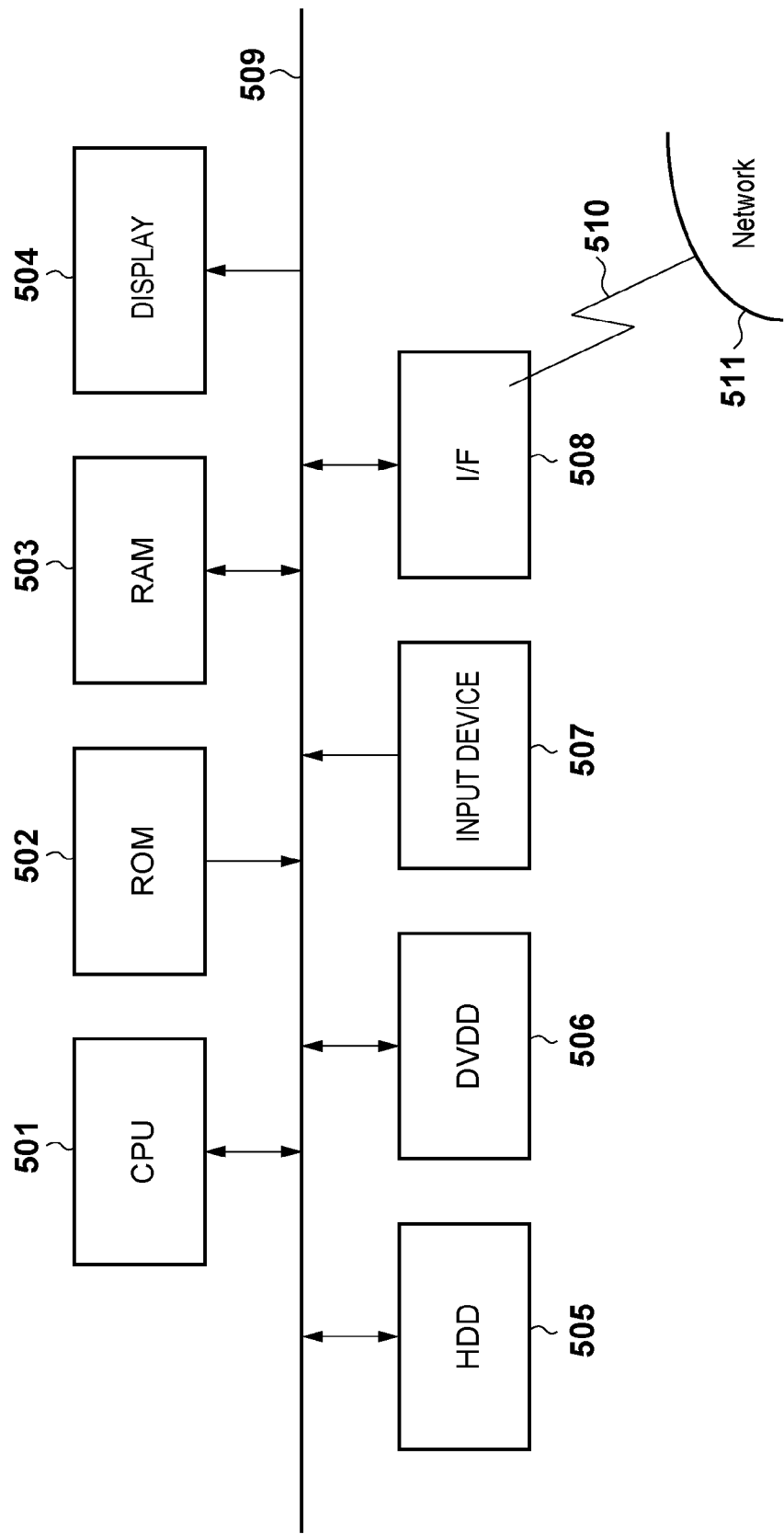
FIG. 5 is a block diagram showing a client according to the embodiment.

Referring to FIG. 5, components 501 to 507 and 509 respectively correspond to the components 401 to 407 and 409, and their names and functions are the same.

Reference numeral 508 denotes a network interface similar to the network interface 408, which is connected with a computer network 511 via a communication line 510. The network interface 508 receives various data including image data from the server 101, and the received data are displayed on the display 504 in response to a user operation.

Image File Structure

The structure of an image file according to this embodiment will be explained with reference to FIG. 6.

Figure 6:
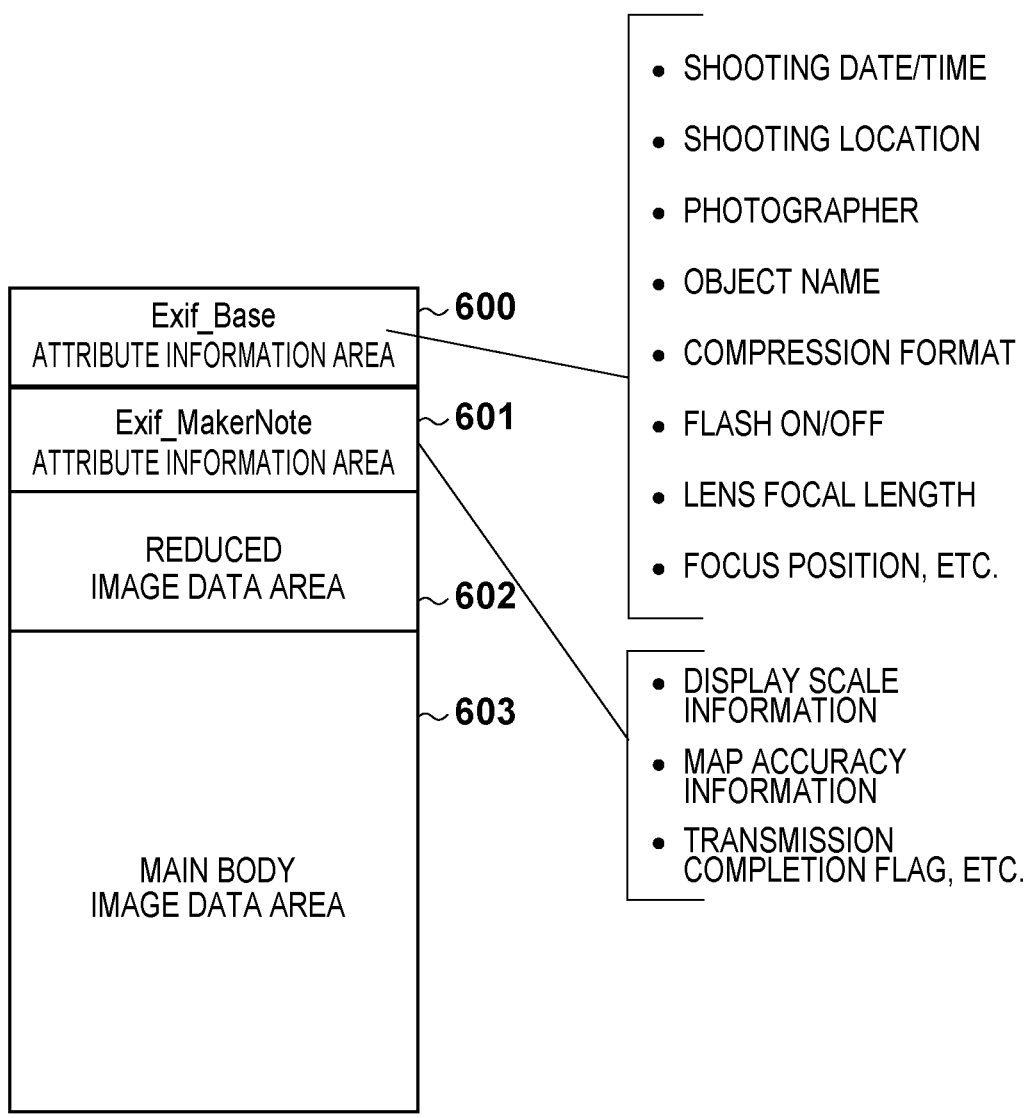
FIG. 6 is a schematic view showing the structure of an image file according to the embodiment.

Referring to FIG. 6, reference numerals 600 and 601 denote areas which record image attribute information according to the Exif standard. The area 600 records basic information of the Exif standard, and stores information in shooting an image such as an image data size, shooting date/time, shooting location, shooting model, and flash on/off, and information necessary for reading out, playing back, and controlling an image.

The area 601 records image attribute information in a form specific to the manufacturer of the digital still camera according to the Exif standard, and stores information necessary for control such as a transmission completion flag, display scale information, and map accuracy information. The transmission completion flag indicates whether transmission to the server is complete.

Reference numeral 602 denotes a reduced image data area which stores reduced image data to be displayed in displaying a list; and 603, a main image data area which stores all image data to be stored as an image file. After the CPU 201 generates image data using the image capturing apparatus 200, an image file having the structure shown in FIG. 6 is generated by adding the image attribute information, and stored in a storage medium via the storage medium mounting unit 208. The series of processes is indicated by "shooting".

In generating an image file, the CPU 201 acquires position information using a GPS, and stores, as a shooting location, information such as a latitude, longitude, altitude, and position monitoring time in the Exif_Base attribute information area 600. In generating an image file, the CPU 201 writes FALSE in the transmission completion flag of the Exif_MakerNote attribute information area 601, 0 in the display scale information, and 0 in the map accuracy information. A method of using the transmission completion flag and the display scale information will be described later. The map accuracy information will be described later in the third embodiment.

Image Display Scale Designation

A user interface and various buttons of the digital still camera which serves as an image transmission apparatus according to this embodiment will be explained in detail with reference to FIG. 3.

The digital still camera of this embodiment has four modes, and operates according to each mode. The modes include a "shooting mode" for shooting, a "playback mode" for displaying image data in a storage medium, a "setting mode" for making various settings, and a "transmission mode" for transmitting data to the server or personal computer. The "setting mode" will be mainly described in this embodiment. For all the buttons except for a power button 302, an operation when the digital still camera is ON will be described.

Referring to FIG. 3, reference numeral 300 denotes a release button. When the user presses the release button 300, the CPU 201 determines that the user has instructed to shoot, switches to a shooting mode, and performs shooting processing.

Reference numeral 301 denotes a display; and 302, a power button for turning on or off the power. Assume that the digital still camera is OFF. In this case, when the user presses the power button 302, the CPU 201 determines that the user has instructed power-on, and then turns on the power. Assume that the digital still camera is ON. In this case, when the user presses the power button 302, the CPU 201 determines that the user has instructed power-off, and then turns off the power.

Reference numeral 303 denotes a shooting mode button 303. When the user presses the shooting mode button 303, the CPU 201 determines that the user has instructed to switch to a shooting mode, switches to a shooting mode, and prepares for shooting using the image capturing apparatus 200 while displaying an imaged image on the display 301.

Reference numeral 304 denotes a playback button. When the user presses the playback button 304, the CPU 201 determines that the user has instructed to switch to a playback mode, and loads image data from a storage medium to display an image on the display 301.

Reference numeral 305 denotes a setting button. When the user presses the setting button 305, the CPU 201 determines that the user has instructed to switch to a setting mode, and displays a setting screen on the display 301. FIG. 3 shows a case in which the display 301 displays a setting screen.

Reference numeral 311 denotes a transmission button. When the user presses the transmission button 311, the CPU 201 determines that the user has instructed to switch to a transmission mode, loads image data from a storage medium, changes image attribute information (to be described later), and then transmits the data to a transmission destination designated in a setting mode.

Reference numeral 307 denotes an up arrow button; 308, a down arrow button; 309, a left arrow button; and 310, a right arrow button. When the user presses one of these buttons, the CPU 201 determines that the user has instructed to switch an operation target in the setting screen, and switches a selection target according to the direction of the arrow.

Reference numeral 312 denotes a selection frame indicating a selected state. The CPU 201 changes the position of the frame in response to an operation of the arrow button 307, 308, 309, or 310. Reference numeral 306 denotes a selection button. When the user presses the selection button 306, the CPU 201 determines that the user has pressed an operation member selected as an operation target or instructed determination, and then operates.

Reference numeral 313 denotes a transmission destination edit box for displaying a transmission destination; and 314, a character input area for inputting various characters. When the user selects characters, and presses the selection button 306, the characters are input. Reference numeral 315 denotes an input end button.

When the user selects the transmission destination edit box 313, and presses the selection button 306, it is possible to edit the transmission destination. At the same time, it is possible to operate the character input area 314. When the user inputs a character string, selects the input end button 315, and presses the selection button 306, the CPU 201 determines that the user has completed a character string input operation, and displays the input character string in the transmission destination edit box 313.

Operation members 316 and 317 are related to settings for causing the display unit not to display attribute information of the shooting location about privacy in detail.

The operation member 316 indicates a detailed location no-display checkbox. If the check box ON, no display is set such that the viewer does not discriminate the detailed location information when the image is displayed on the map. When the user selects the detailed location no-display checkbox, and presses the selection button 306, the CPU 201 determines that the user has performed a setting changing operation, and switches an ON/OFF state. When the user presses the selection button 306 with the detailed location no-display checkbox checked, that is, the checkbox ON, the CPU 201 deselects the checkbox to set it to an OFF state. When the user presses the selection button 306 with the checkbox unselected, that is, the checkbox OFF, the CPU 201 selects the checkbox to set it to an ON state. The CPU 201 holds the ON/OFF state in the storage medium via the media drive 208.

The operation member 317 indicates a display scale setting box. When the user selects the display scale setting box, and presses the selection button 306, the CPU 201 determines that the user has performed a setting changing operation, and displays a pull-down menu. In this case, displayed menu items are "1/1000 or lower", "1/2000 or lower", "1/5000 or lower", and "1/10000 or lower". When the user operates the arrow button 307 or 308 to switch selection in the pull-down menu, and then presses the selection button 306, the CPU 201 determines that the user has selected a setting, and closes the pull-down menu.

When the user presses the setting button 305 to switch to another mode, the CPU 201 stores, in the storage medium via the media drive 208, all the pieces of information which have been set by the user in the setting mode. The CPU 201 reads out information as needed, and uses it for image transmission processing.

Image Transmission Processing

Processing of writing display scale information in the Exif_MakerNote attribute information area 601 of an image, and transmitting the image to the server 101 in the digital still camera 100 serving as an image transmission apparatus according to this embodiment will be described with reference to FIG. 7. Note that this processing is executed when the CPU 201 executes a control program stored in the RAM 203.

Figure 7:
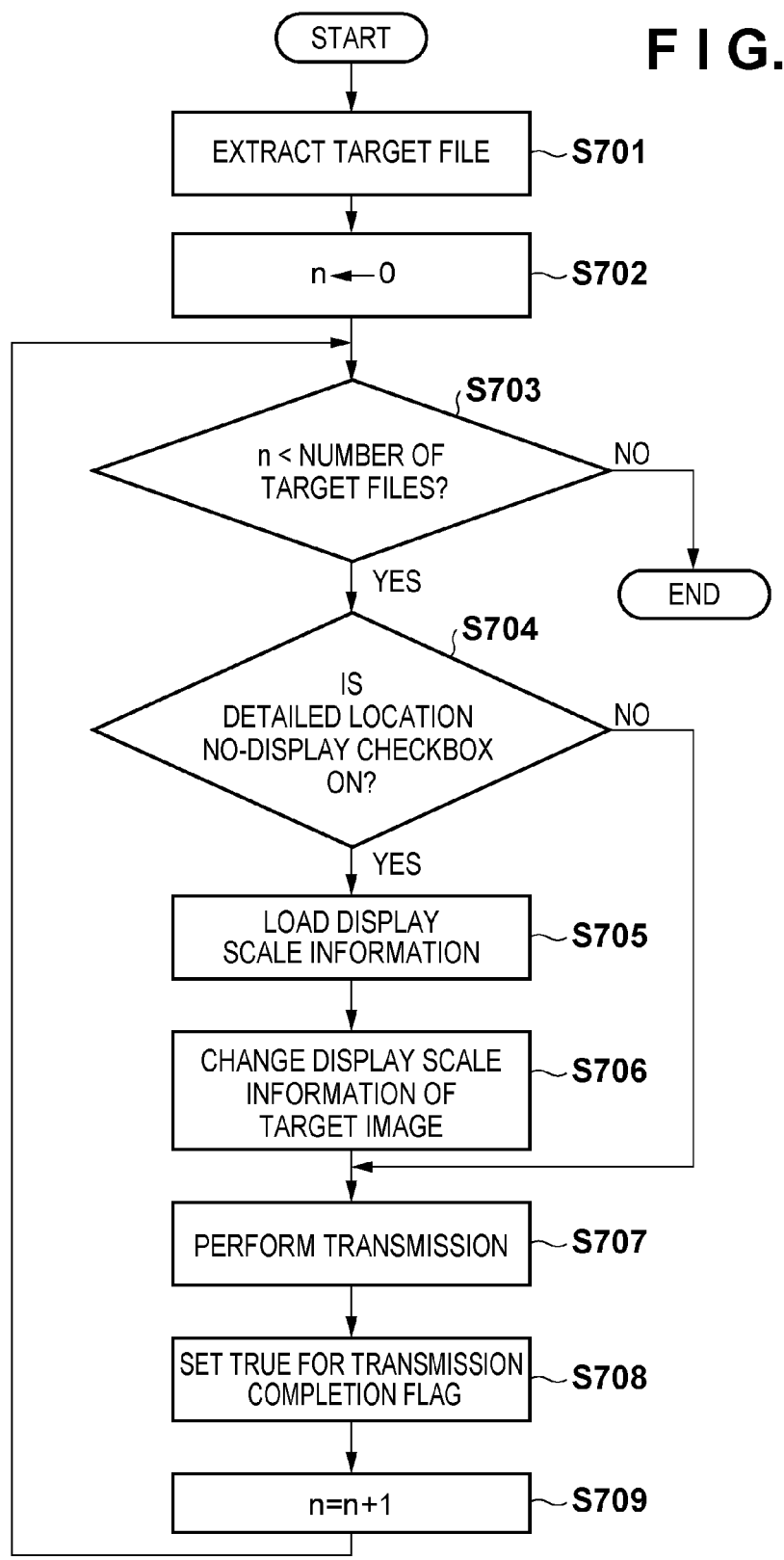
FIG. 7 is a flowchart illustrating image transmission processing according to the first embodiment.

Referring to FIG. 7, in step S701, the CPU 201 extracts a target image file. First, for all image files stored in a storage medium, the CPU 201 refers to the transmission completion flag of the Exif_MakerNote attribute information area 601. Then, the CPU 201 determines and extracts, as a target, an image file whose transmission flag is FALSE. Alternatively, image files selected by the user may be set as the target to be transmitted instead of transmission of all image files.

In step S702, the CPU 201 sets 0 in a counter n. The counter n is used when the CPU 201 executes a series of processes in steps S704 to S708 (to be described later) for each target image file.

In step S703, the CPU 201 determines whether the counter n is smaller than the number of target image files.

If the CPU 201 determines in step S703 that the counter n is smaller than the number of target image files, the process advances to step S704.

If the CPU 201 determines in step S703 that the counter n is equal to or larger than the number of target image files, it determines that the series of processes is complete for all the target images, and ends the processing.

In step S704, the CPU 201 loads the state of the detailed location no-display checkbox 316 from the storage medium via the media drive 208, and determines whether the state of the checkbox is ON.

If the CPU 201 determines in step S704 that the detailed location no-display checkbox 316 is in an ON state, the process advances to step S705.

If the CPU 201 determines in step S704 that the detailed location no-display checkbox 316 is in an OFF state, the process advances to step S707. In this case, since the processes of S705 and S706 described later are not executed, the display scale information of the Exif_MakerNote attribute information area 601 of the nth target image is still zero. The zero state of the display scale information means that the display scale information is not set. Alternatively, other information for permitting or inhibiting to layout the image on the map may be recorded.

In step S705, the CPU 201 loads, from the storage medium via the media drive 208, a scale set in the display scale setting box 317.

In step S706, the CPU 201 writes the scale loaded in step S705 in the display scale information of the Exif_MakerNote attribute information area 601 of the nth target image. If a display scale of 1/1000 or lower is designated for example by the display scale setting box 317, the CPU 201 writes, in the display scale information, the value 1000 of the denominator, that is, 1000. If a scale of 1/5000 or lower is designated by the display scale setting box 317, the CPU 201 writes, in the display scale information, the value of the denominator, that is, 5000. If the display scale information has been recorded, it has been designated whether or not the image is laid out at the position on the map corresponding to the position information. If the display scale information has not been recorded (zero is recorded), the CPU 201 determines that the user accepts the setting for designating that images are not always displayed on the map.

In step S707, the CPU 201 connects to the computer network 212 via the network interface 209 through the communication line 211, and transmits the data to a server as a set transmission destination. Assume that the transmission destination has been set in the transmission destination edit box 313 by the user. If the user has not made the setting, a predetermined transmission destination may be used, or a warning may be displayed to prompt the user to make the setting.

In step S708, the CPU 201 rewrites the transmission completion flag of the target image file with TRUE.

In step S709, the CPU 201 increments the counter n.

Image Control Processing

Processing of controlling based on display scale information whether to lay out an image on a map, and distributing map data and image data to the client via the computer network 103 in the server 101 serving as an image control apparatus according to this embodiment will be described with reference to FIG. 8. Note that this processing is implemented when the CPU 401 executes a control program stored in the RAM 403. Assume that the CPU 401 of the server 101 has received, at the network interface 408 via the computer network 411, an image file transmitted from the digital still camera 100, and has stored it in the HDD 405, in advance. Assume also that a state in which it is possible to bidirectionally transmit/receive data has been established between the server 101 and the client 102. The image control processing of FIG. 8 does not distribute the same data to a plurality of clients but individually distributes data according to display conditions for each client. Assume that the server 101 holds, in the HDD 405, map data for all areas corresponding to various scales.

Figure 8:
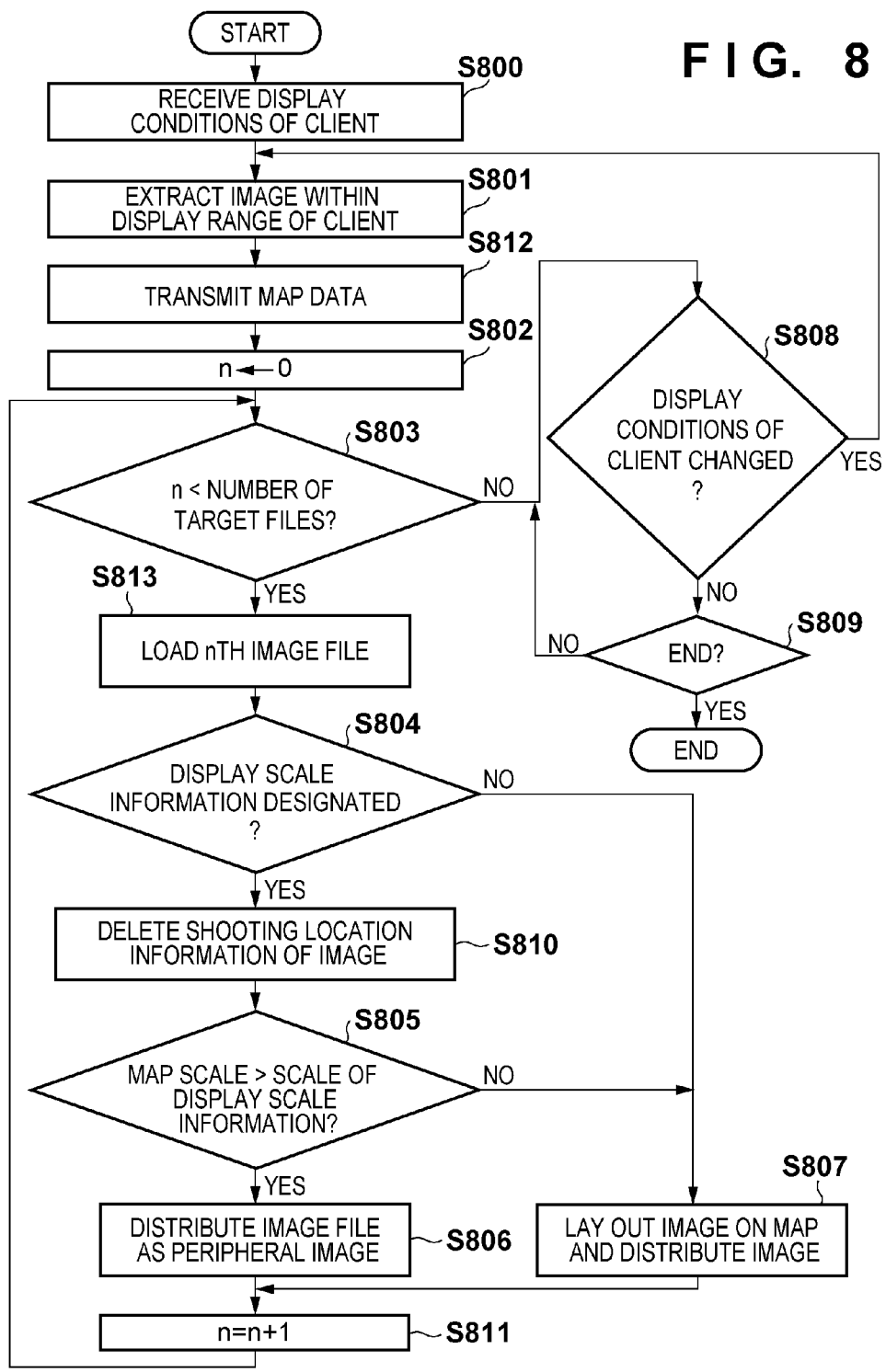
FIG. 8 is a flowchart illustrating image control processing according to the first embodiment.

Referring to FIG. 8, in step S800, the CPU 401 receives and acquires information of the display conditions set by the client 102 at the network interface 408 via the computer network 411. The display conditions include a range of latitude and longitude and a scale of a map to be displayed in the client 102. The CPU 401 sets a map scale or display range as a criterion for generating display data based on the acquired client's display condition and holds the set information in itself. The set information of the map scale and/or display range is referred in a subsequent process of obtaining map data or generating display data.

In step S801, the CPU 401 extracts an image whose shooting location falls within the range of latitude and longitude of the display conditions received in step S801. First, for all image files stored in the HDD 405, the CPU 401 refers to the shooting location information of the Exif_Base attribute information area 600. The CPU 401 determines and extracts, as a target, an image file whose shooting location information falls within the range of latitude and longitude.

In step S812, the CPU 401 loads, from the HDD 405 into the RAM 403, map data corresponding to the map scale and/or display range set based on the display conditions of the client, and transmits the map data to the client 102 via the computer network 411.

In step S802, the CPU 401 sets 0 in a counter n. The counter n is used when the CPU 401 executes a series of processes described later for each target image file.

In step S803, the CPU 401 determines whether the counter n is smaller than the number of target image files.

If the CPU 401 determines in step S803 that the counter n is smaller than the number of target image files, the process advances to step S813.

If the CPU 401 determines in step S803 that the counter n is equal to or larger than the number of target image files, the process advances to step S808.

In step S813, the CPU 401 loads, as a target file, the nth file from the HDD 405 into the RAM 403.

In step S804, the CPU 401 determines whether the display scale information of the Exif_MakerNote attribute information area 601 of the target file has been designated and the process advances to step S807.

The CPU 401 determines in step S804 that the display scale information has been designated if the display scale information has a value of 1 or larger, the process advances to step S810.

The CPU 401 determines in step S804 that the display scale information has not been designated and set if the display scale information has a value of zero, the process advances to step S807.

In step S810, the CPU 401 deletes the shooting location information of the Exif_Base attribute information area 600 of the image file in the RAM 403. This is done to avoid a detailed location from being specified from the attribute information of the image in distributing the image file to the client.

In step S805, the CPU 401 determines whether the map scale set in step S800 is higher than a scale indicated by the display scale information acquired in step S804. If the value of the display scale information is 5000, the scale indicated by the display scale information is 1/5000.

If the CPU 401 determines in step S805 that the map scale set in step S800 is higher than the scale indicated by the display scale information, the process advances to step S806.

If the CPU 401 determines in step S805 that the map scale set in step S800 is equal to or lower than the scale indicated by the display scale information, the process advances to step S807.

In step S806, the CPU 401 distributes, as a peripheral image, the image file in the RAM 403 to the client 102 via the computer network 411. The image files distributed at step S806 are not associated with the position on the map. The distributed display data may be separated to the image file and map information as different files or display data combined with the map data and image data in which the image has not been laid out on the map. When the image file and map information are separately transmitted, information for instructing to the client device such that the image is displayed on an area other than the map display area may be transmitted at the same time. The client 102 displays the image file on an area being different from the map area without superposing the image file on the map base on the obtained display data. It is impossible to discriminate the shooting location on the map but it is possible to discriminate somewhere the image has been shot in the displayed map.

In step S807, the CPU 401 associates the image with an image layout position on the map, and distributes the image file in the RAM 403 to the client 102 via the computer network 411. A method of calculating an image layout position on the map according to this embodiment will be described later. In this case, the image is displayed on the map display range at a location corresponding to the shooting location information of the attribute information area 600. In other words, the image is laid out on the displayed map so as to discriminate the shooting location information of the attribute information area 600. It is arbitrarily variable that the shooting location information of the attribute information area 600 corresponds to a center or upper left of the displayed image.

In step S811, the CPU 401 increments the counter n. The process then returns to step S803.

In step S808, the CPU 401 determines whether the display conditions of the client have been changed. A method of changing the display conditions of the client will be described later.

If the CPU 401 determines in step S808 that the display conditions of the client have been changed, the process returns to step S801.

If the CPU 401 determines in step S808 that the display conditions of the client have not been changed, the process advances to step S809.

In step S809, the CPU 401 determines whether the user has instructed to end the processing. A method in which the user instructs to end the processing will be described later.

If the CPU 401 determines in step S809 that the user has instructed to end the processing, it ends the series of processes.

If the CPU 401 determines in step S809 that the user has not instructed to end the processing, the process returns to step S808.

Figure 9:
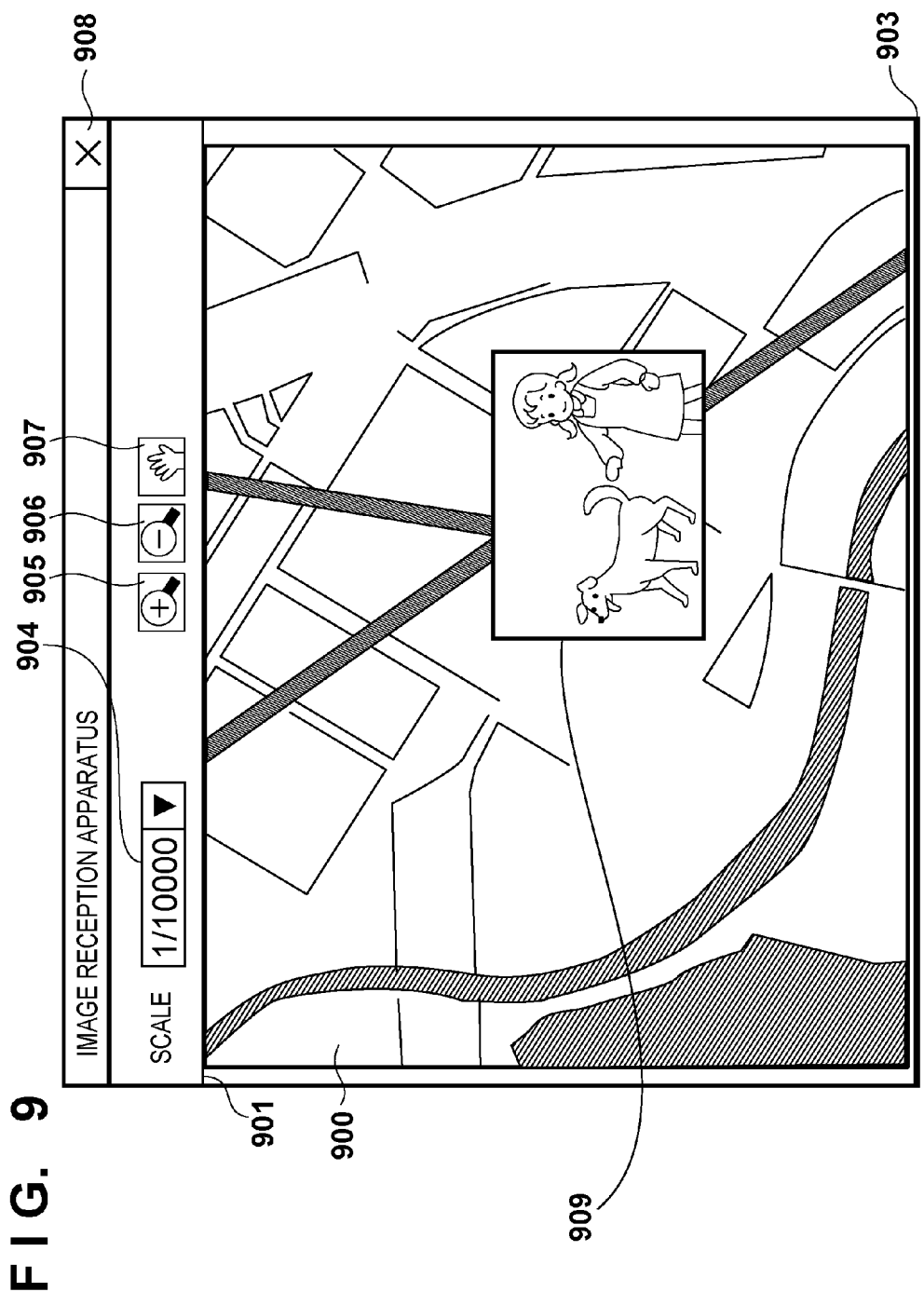
FIG. 9 is a view showing a user interface example on the image reception apparatus side according to the first embodiment.
Figure 10:
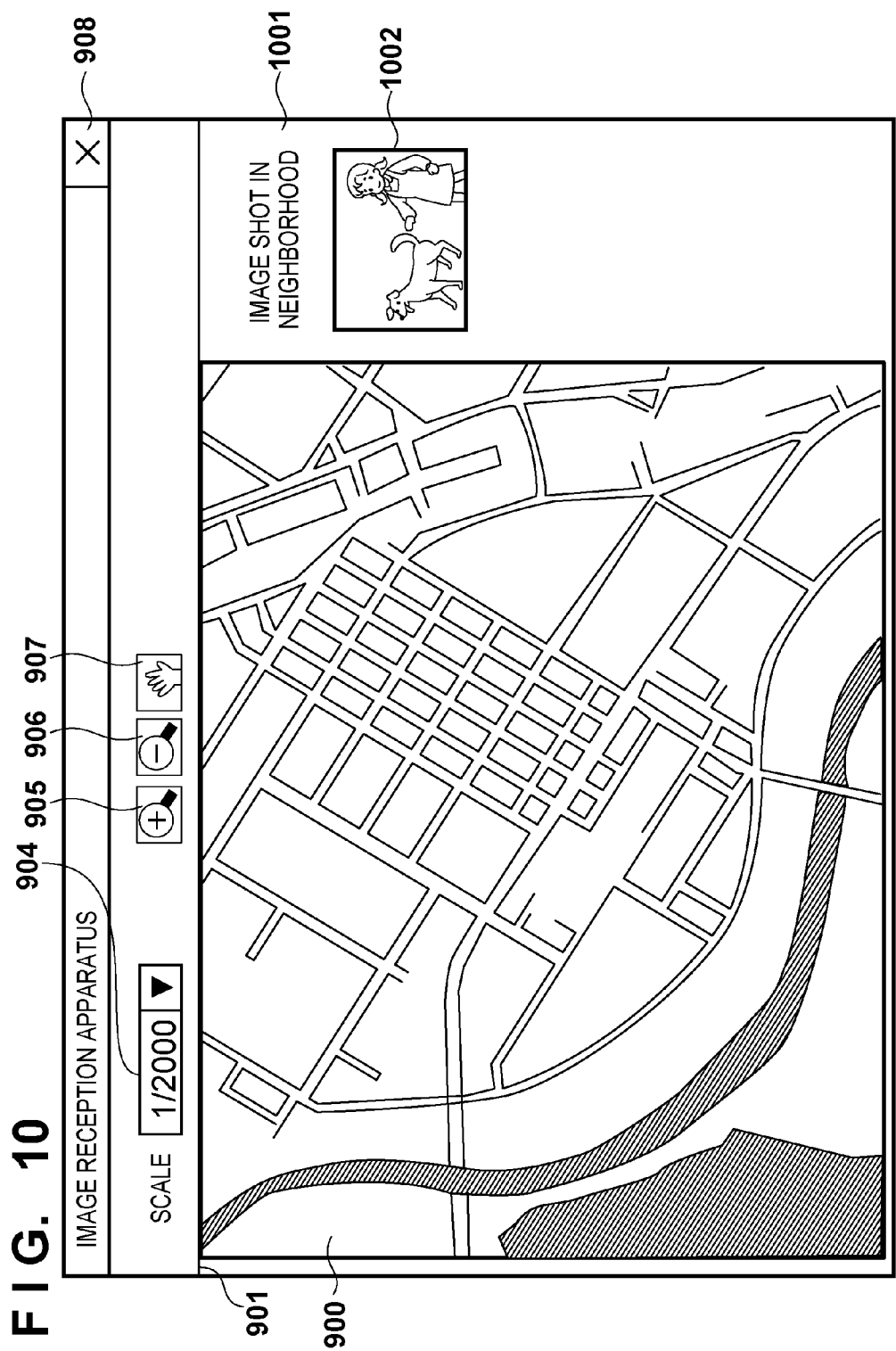
FIG. 10 is a view showing a user interface example on the image reception apparatus side according to the first embodiment.

The user interface of the client serving as an image reception apparatus according to this embodiment will be explained with reference to FIGS. 9 and 10. Note that common operation members in FIGS. 9 and 10 are given the same reference numerals and a description thereof will be omitted. FIGS. 9 and 10 each show a case in which a viewer downloads, to the client via the computer network, an image distributed by a photographer in the server, and views the image. Assume that in transmitting the image to the server, the photographer sets the detailed location no-display checkbox to an ON state, and sets 1/5000 or lower in the display scale information.

Referring to FIG. 9, reference numeral 900 denotes a map display area. A map of a predetermined area is downloaded from the server for managing map information via the Internet, and then displayed. Assume that for the predetermined area, a range including the shooting location of the image being distributed can be downloaded from the server. Reference numeral 901 denotes the upper left corner coordinates of the map display area, which corresponds to the North-West corner in the map being displayed. Reference numeral 903 denotes the lower right corner coordinates of the map display area, which corresponds to the South-East corner in the map being displayed.

By operating operation members 904 to 907, the user can change a map scale and a display range. The set information of the map scale and/or display range is transmitted to the server as a display condition. The information of the map scale and/or display range designated by the user using the operation members 904 to 907 is transmitted to the server as the display conditions via the computer network 511 by the CPU 501.

The operation member 904 indicates a map scale setting box for designating a map scale. When the user selects and presses a down arrow button on the right of the map scale setting box, the CPU 501 displays a pull-down menu for setting the map scale. In this embodiment, displayed menu items are "1/1000", "1/2000", "1/5000", "1/10000", and "1/50000" at this case. When the user selects one of the items of the pull-down menu, the CPU 501 determines that the user has selected a setting, and closes the pull-down menu. The CPU 501 displays the selected scale in the map scale setting box 904.

The operation members 905 and 906 indicate buttons for changing the map scale. If the user presses the zoom in button 905, the scale is increased by one step with respect to the center of the map display area 900. When the user presses the zoom in button with a scale of 1/5000 set, the scale is changed to a scale of 1/2000 one step higher than a scale of 1/5000. When the scale is set to 1/1000, the zoom in button 905 is invalidated since the scale cannot be set larger.

When the user presses the zoom out button 906, the scale is decreased by one step with respect to the center of the map display area 900. When the user presses the zoom out button 906 with a scale of 1/5000 set, the scale is changed to a scale of 1/10000 one step lower than a scale of 1/5000. If the scale is set to 1/50000, the zoom out button 906 is invalidated since the scale cannot be set smaller.

The operation member 907 indicates a hand-shaped toggle button for changing the map display area. When the user presses the hand-shaped toggle button which is convex, the CPU 501 determines that the hand-shaped tool has been set, and changes the shape of a cursor to a hand shape while displaying the button which is concave. When the user presses the hand-shaped toggle button which is concave, the CPU 501 determines that the hand-shaped tool has been canceled, and changes the shape of the cursor to an arrow shape while displaying the button which is convex. The function of the hand-shaped tool, for example, when the pointing device is a mouse will be explained. When the user drags the mouse in the map display area 900 with the hand-shaped tool set, the CPU 501 determines that the user has instructed to change the map display range, and changes the map display range. When the user drags the mouse in the lower right direction, the CPU 501 changes the map display range in the upper left direction. When the user drags the mouse in the upper left direction, the CPU 501 changes the map display range in the lower right direction.

Reference numeral 908 denotes an end button. When the user presses the end button, the CPU 501 determines that the user has instructed to end processing, and ends map and image playback processing. At the same time, the CPU 501 transmits, to the server, a notification indicating that the user has instructed to end the processing.

Reference numeral 909 denotes a reduced image of image data distributed from the server in association with a shooting location on the map. The CPU 501 receives the layout position from the server, and lays out the image so that the layout position is placed within a rectangle formed by the four vertices of the reduced image. Note that when the CPU 501 lays out the image so that the shooting position always matches with the center of the reduced image, the shooting location can be specified in detail, but if it is desired to prevent a viewer from precisely specifying a shooting location the shooting location may be intentionally laid out at a position slightly shifted from the center of the reduced image. Therefore, it is difficult to specify the shooting location by the position shifted while the user can specify a rough position. Note that if there is no matter for the viewer to precisely specify a shooting location, the image may be laid out such that the shooting location always matches with a specific position such as an upper left of the reduced image but not the center of the reduced image. Further, there may be a display manner that a pin is displayed on the map position corresponding to the shooting position, and the pin and reduced image are connected by a line. In either case, it is necessary that the shooting location corresponds to the reduced image laid out position on the map.

Referring to FIG. 10, reference numeral 1001 denotes a peripheral image display area which is provided outside the map area, and displays an image shot in the neighborhood; and 1002, a reduced image of image data distributed as a peripheral image from the server. Since the reduced image 1002 is displayed outside the display area of the map, a viewer cannot specify the shooting location of the image in the display area of the map.

Method of Calculating Layout Position on Map

A method of calculating the coordinates (shotX, ShotY) of the shooting location in step S807 will be explained by assuming that variables respectively hold the following values. Coordinates in the map display area are defined by considering the abscissa as the X-axis, the ordinate as the Y-axis, and the point 901 as an origin.

mapN0: the latitude (degrees) of the origin 901
mapE0: the longitude (degrees) of the origin 901
mapN1: the latitude (degrees) of the point 903
mapE1: the longitude (degrees) of the point 903
shotN: the latitude (degrees) of the shooting location of the image
shotE: the longitude (degrees) of the shooting location of the image
uiX0: the X coordinate (pixel) of the origin 901 within the map display area
uiY0: the Y coordinate (pixel) of the origin 901 within the map display area
uiX1: the X coordinate (pixel) of the point 903 within the map display area
uiY1: the Y coordinate (pixel) of the point 903 within the map display area
shotX: the X coordinate (pixel) of the shooting location within the map display area
shotY: the Y coordinate (pixel) of the shooting location within the map display area To make the position of the actual shooting location coincide with the position of the shooting location within the map display area, the following equations (1) and (2) should be satisfied. Equations (3) and (4) indicate a method of calculating the coordinates of the shooting location, which satisfies the above conditions.

$$(mapE0-mapE1):(shotE-mapE1)=(uiX0-uiX1):(shotX-uiX1) \quad (1)$$

$$(mapN0-mapN1):(shotN-mapN1)=(uiY0-uiY1):(shotY-uiY1) \quad (2)$$

$$shotX=((uiX0-uiX1)\times(shotE-mapE1))\div(mapE0-mapE1)+uiX1 \quad (3)$$

$$shotY=((uiY0-uiY1)\times(shotN-mapN1))\div(mapN0-mapN1)+uiY1 \quad (4)$$

Practical Example

A practical example of the method of calculating the coordinates (shotX, shotY) of the shooting location in step S807 will be described next.

Assume that a map acquired from the server ranges from a latitude of 43° 45' and a longitude of 142° 25' to a latitude of 43° 25' and a longitude of 142° 45'. Assume also that the detailed shooting location of the image is at a latitude of 43° 35' and a longitude of 142° 35'. Furthermore, the coordinates (uiX1, uiY1) within the map display area are (0, 0), and the coordinates (uiX0, uiY0) are (1500, 2000). Values corresponding to the respective variables are given by mapN0=43.45
mapE0=142.25
mapN1=43.25
mapE1=142.45
shotN=43.35
shotE=142.35
uiX0=0
uiY0=0
uiX1=2000
uiY1=1500 ... (5)

Calculation results obtained by substituting the values of equations (5) into equations (3) and (4) are given by $$shotX=((uiX0-uiX1)\times(shotE-mapE1))\div(mapE0-mapE1)+uiX1=((0-2000)\times(142.35-142.45))\div(142.25-142.45)+2000=1000 \quad (6)$$

$$shotY=((uiY0-uiY1)\times(shotN-mapN1))\div(mapN0-mapN1)+uiY1=((0-1500)\times(43.35-43.25))\div(43.45-43.25)+1500=750 \quad (7)$$

The above-described method calculates the shooting location. If the results represented by equations (6) and (7) are obtained, a position shifted from the origin 901 by 1,000 pixels in the x direction and by 750 pixels in the Y direction is determined as a shooting location.

A practical example of processing in the server serving as an image control apparatus and the client serving as an image reception apparatus will be described with reference to FIG. 8.

Assume that in transmitting an image to the server, the photographer sets the detailed location no-display checkbox to an ON state, and sets the scale of display scale information to 1/5000 or lower. Assume also that the shooting location is at a latitude of 43° 35' and a longitude of 142° 35', and the HDD 405 of the server holds one image file described above.

A case in which a map displayed in the client 102 ranges from a latitude of 43° 45' and a longitude of 142° 25' to a latitude of 43° 25' and a longitude of 142° 45' and, a map scale is 1/10000 will be described.

In step S800, the CPU 401 receives the display conditions of the client 102. The CPU 401 sets a map scale and/or display range as a criterion for generating display data based on the acquired client's display condition and holds the set information in itself.

In step S801, the CPU 401 extracts an image whose shooting location falls within the range of latitude and longitude of the display conditions received in step S800. That is, the CPU 401 extracts one image file which has been shot at a latitude of 43° 35' and a longitude of 142° 35'.

In step S812, the CPU 401 transmits map data satisfying the display conditions of the client 102.

In step S802, the CPU 401 sets 0 in a counter n.

In step S803, the CPU 401 determines whether the counter n is smaller than the number of target image files. The number of target image files in step S801 is 1. If, therefore, the counter n is 0, the process advances to step S813.

In steps S813 and S804, the CPU 401 loads a target file from the HDD 405 into the RAM 403, and determines whether the display scale information of the Exif_MakerNote attribute information area 601 has been designated. If the scale of the display scale information is set to 1/5000 or lower, the display scale information has a value of 5000. Therefore, it is determined that the display scale information has been designated, and the process advances to step S810.

In step S810, the CPU 401 deletes the latitude of 43° 35' and the longitude of 142° 35' of the shooting location information of the image file in the RAM 403.

In step S805, the CPU 401 determines whether the map scale set in step S800 is higher than the scale indicated by the display scale information acquired in step S804. If the value of the display scale information is 5000, the scale indicated by the display scale information is 1/5000. Since the scale of the client is 1/10000, it is determined that the scale of the client is lower than the scale indicated by the display scale information, and the process advances to step S807.

In step S807, the CPU 401 associates the image with an image layout position on the map, and distributes the image file in the RAM 403 to the client 102 via the computer network 411. A method of calculating an image layout position on the map is as described using equations (3) and (4). With this processing, the client 102 lays out and displays the image on the map, as shown in FIG. 9.

In step S808, the CPU 401 determines whether the display conditions of the client have been changed. If the CPU 401 determines that the display conditions of the client have not been changed, the process advances to step S809. It is supposed that the client's display conditions have been transmitted to the server 101 in the background of the routine of FIG. 8 (not shown). In step S808, the CPU 401 determines whether or not the client's display conditions have been changed by analyzing the contents of the received display conditions.

In step S809, the CPU 401 determines whether the user has instructed to end the processing. If the CPU 401 determines that the user has not instructed to end the processing, the process returns to step S808.

A case in which the map displayed in the client 102 ranges from a latitude of 43° 33' and a longitude of 142° 33' to a latitude of 43° 37' and a longitude of 142° 37', and a map scale is changed to 1/2000 will be described.

The CPU 401 determines in step S808 that the display conditions of the client have been changed, and the process returns to step S801.

In step S801, the CPU 401 extracts an image whose shooting location falls within the range of latitude and longitude of the display conditions received in step S808. That is, the CPU 401 extracts an image shot at a latitude of 43° 35' and a longitude of 142° 35'.

The processing in steps S802 to S810 is the same as that in a case wherein the map scale is 1/10000.

In step S805, the CPU 401 determines whether the scale of the client received in step S801 is higher than a scale indicated by the display scale information acquired in step S804. Since the scale of the client is 1/2000 and the scale indicated by the display scale information is 1/5000, the CPU 401 determines that the scale of the client is higher than the scale indicated by the display scale information, and the process advances to step S806. With this processing, the client 102 displays the image as a peripheral image without laying out the image on the map, as shown in FIG. 10.

In step S808, the CPU 401 determines whether the display conditions of the client have been changed. If the CPU 401 determines that the display conditions of the client have not been changed, the process advances to step S809.

In step S809, the CPU 401 determines whether the user has instructed to end the processing. If the CPU 401 determines that the user has instructed to end the processing, it ends the series of processes.

In this embodiment, a case in which there is one image file to be processed has been explained. Even if there are a plurality of files, however, it is possible to implement the present invention. In this case, the processing in steps S803 to S811 need only be repeatedly executed the number of times which is equal to that of files.

In this embodiment, a case in which display scale information and shooting location information are held in an image file has been described. These pieces of information, however, may be recorded as data other than an image file as long as they are associated with the image file.

In this embodiment, a case in which display scale information is held in an individual image file has been explained. One piece of display scale information, however, may be associated with a plurality of image files.

Modification of Scale Determination Method

Although the accuracy of a map on which an image is displayed is designated by a scale by operating the digital still camera in this embodiment, it may be designated by the protection level of private information. In this case, display scale information associated with the protection level is held in the HDD 405 of the server. More specifically, a scale of 1/1000 is associated with level 1, a scale of 1/2000 is associated with level 2, and a scale of 1/5000 is associated with level 3. Processing of loading corresponding display scale information based on a protection level is performed between steps S810 and S805, and then the determination processing in step S805 is executed. If the map accuracy is designated by a scale, it may be difficult for the user to intuitively recognize a detail with which the shooting location is specified. If, therefore, the map accuracy is designated by an abstract value such as a protection level, it is easier for the user to select the accuracy.

Although, in this embodiment, the accuracy of a map on which an image is displayed is designated by a scale by operating the digital still camera, it may be designated by distance at which it is possible to specify a shooting location. In this case, display scale information associated with distance is held in the HDD 405 of the server. More specifically, a distance of 500 m is associated with a scale of 1/1000, a distance of 1 km is associated with a scale of 1/2000, and a distance of 2.5 km is associated with a scale of 1/5000. Processing of loading corresponding display scale information based on a distance is performed between steps S810 and S805, and then the determination processing in step S805 is executed. If the map accuracy is designated by a scale, it may be difficult for the user to intuitively recognize an accuracy with which the shooting location is specified. If, therefore, the map accuracy is indicated by a square with a certain size in which it is possible to specify the shooting location, it is easier for the user to select the accuracy.

Modification of Display Method when Scale is Low

A case in which the reduced image 909 of this embodiment is laid out so that the layout position received from the server is placed within a rectangle formed by the four vertices of the reduced image has been explained. However, the server side may change, in advance, the layout position to make it difficult to specify a shooting location. This is because if the layout position is calculated based on detailed information and the layout position is placed at the center of the reduced image, a viewer can specify a shooting location. To calculate a layout position, a location where the numbers of significant digits of a latitude and longitude have been decreased is set as an origin. Then, the origin is distributed to the client. With this processing, even if a reduced image is laid out on the map so that a layout position is placed at the center of the reduced image, it is possible to make it difficult to specify a shooting location. A method of decreasing the number of significant digits may be rounding up, rounding off, or rounding down. A combination of them may be possible. That is, a latitude may be rounded up, and a longitude may be rounded off. If the number of significant digits is decreased by a different method for each image, it becomes more difficult for a viewer to specify a detailed shooting location.

Handling of Image Positioned at Corner of Map

In step S801 of this embodiment, the CPU extracts an image whose shooting location falls within a display range. For an image whose display scale information has been designated, however, it is suitable to make the determination based on shooting location information in which the numbers of significant digits of a latitude and longitude have been decreased. This is because, depending on whether the image appears as a peripheral image due to a change in map display range, it may be possible to discriminate the location of the image on the map. By making the determination based on the shooting location information in which the numbers of significant digits of a latitude and longitude have been decreased, it becomes impossible to specify a detailed shooting location.

Modification of Avoidance of Shooting Location Specification Based on Attribute Information In step S810 of this embodiment, shooting location information is deleted from the attribute information of an image file. However, the viewer need only be unable to specify detailed shooting location information from the attribute information. The shooting location information may be encrypted, or the attribute information may be deleted or encrypted in playing back the image in the client.

In this embodiment, the display scale information is set at a digital camera and transmitted to a server while the digital camera transmits images. However, the present invention is not limited to the described manner. For example, the display scale information may be set in advance at the server or the user's instruction may be transmitted from an apparatus other than an image transmission apparatus. In this case, when the user, who transmits images to the server, sets his or her web album, the display scale information may be set by transmitting information for setting the display scale. Further, the setting of the display scale is not limited at the time of transmitting the images. The display scale may be set before or after the images are transmitted to the server. The setting of the display scale is not limited to a case that the display scale is set in response to an instruction transmitted to the server via a network. An administrator of the server may set the display scale by operating the server.

As described above, according to this embodiment, it is impossible to discriminate a shooting location in detail even if a map scale is set to be larger while protecting privacy of a photographer. In addition, it is possible to distribute an image so as to be able to discriminate only its approximate shooting location. Since shooting location information is removed from an image file, and then the image file is distributed, a viewer cannot know a detailed shooting location by analyzing attribute information. Furthermore, even if an image is positioned at a corner of a map, it is possible to avoid a situation in which a viewer specifies a detailed shooting location depending on whether the image appears as a peripheral image.

Second Embodiment

Although a case in which a server serves as an image control apparatus has been described in the first embodiment, a case in which a client serves as an image control apparatus will be explained in the second embodiment. Furthermore, although a case in which a digital still camera serves as an image transmission apparatus has been described in the first embodiment, a case in which a personal computer (hereinafter, PC) of a client serves as an image transmission apparatus will be explained in the second embodiment. It is supposed that the configuration of each of the image control apparatus and the image transmission apparatus is the same as that of the client in the first embodiment and a camera is built in the PC. In other words, image data is not limited to data acquired from an external digital camera. The image control apparatus may capture image data by itself.

Image Display Scale Designation

The user interface of a personal computer serving as an image transmission apparatus will be described with reference to FIG. 11.

Figure 11:
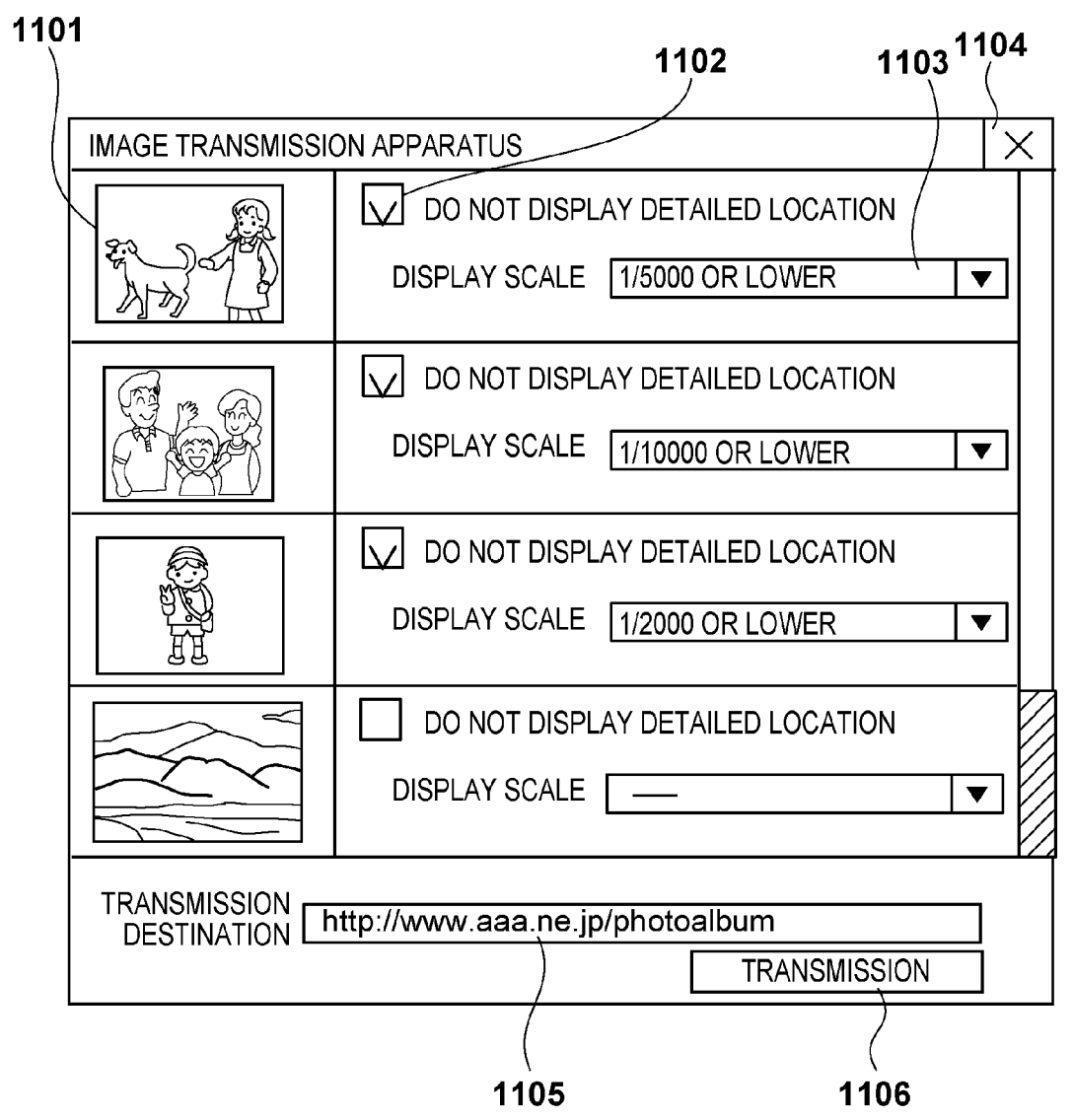

FIG. 11 shows a user interface example in the image transmission apparatus according to this embodiment, and shows a state in which a photographer views images which have not been distributed.

Since there are operation members which perform the same functions as those shown in FIG. 3, the following description will also refer to FIG. 3.

Referring to FIG. 11, reference numeral 1101 denotes a reduced image indicating an image which has not been distributed among images stored in the HDD 505 of FIG. 5. Images arbitrarily selected among images stored in the HDD 505 by the user may be displayed. Reference numeral 1102 denotes a detailed location no-display checkbox, which has the same function as the checkbox 316. The user can set ON/OFF in each image by using the checkbox 1102, and also set a display scale in each image. When the user presses the detailed location no-display checkbox, a CPU 501 determines that the user has performed a setting changing operation, and switches an ON/OFF state. When the user presses the detailed location no-display checkbox which is selected, that is, which is in an ON state, the CPU 501 deselects the checkbox to set it to an OFF state. When the user presses the checkbox which is unselected, that is, which is in an OFF state, the CPU 501 selects the checkbox to set it to an ON state.

Reference numeral 1103 denotes a display scale setting box, which has the same function as the operation member 317. When the user presses a down arrow button of the display scale setting box, the CPU 501 determines that the user has performed a setting changing operation, and displays a pull-down menu. In this case, displayed menu items are "1/1000 or lower", "1/2000 or lower", "1/5000 or lower", and "1/10000 or lower". When the user selects one of the items of the pull-down menu, the CPU 501 determines that the user has selected a setting, and closes the pull-down menu. The CPU 501 displays the selected scale in the display scale setting box 1103.

Reference numeral 1104 denotes an end button. When the user presses the end button, the CPU 501 determines that the user has instructed to end processing, stores the settings of respective operation members in an HDD 505, and ends transmission processing.

Reference numeral 1105 denotes a transmission destination edit box for displaying a transmission destination. When the user selects the transmission destination edit box 1105 using a pointing device such as a mouse, it becomes possible to input a character string. If the user switches to select another operation member after designating a transmission destination using an input device such as a keyboard, the CPU 501 determines that the user has completed a character string input operation, and displays the input character string in the transmission destination edit box 1105.

Reference numeral 1106 denotes a transmission button. When the user presses the transmission button 1106, the CPU 501 determines that the user has instructed transmission processing, and loads image data from the HDD 505. Then, the CPU 501 changes the map accuracy information of an Exif_MakerNote attribute information area 601 according to a display scale setting designated for each image in the UI of FIG. 11. In addition, the CPU 501 encrypts the shooting location information of an Exif_Base attribute information area 600, and transmits the encrypted information to the transmission destination designated in the transmission destination edit box. To allow to acquire the location information in the image control apparatus as a client, the CPU 501 transmits a decryption key. The encryption processing is done to prevent a large number of unspecified viewers from readily specifying a detailed shooting location from the attribute information of the image.

The image transmission processing is as described with reference to FIG. 7 in the first embodiment. In the first embodiment, the same display scale setting is used for images which have not been transmitted. In the second embodiment, however, after changing the map accuracy information of the Exif_MakerNote attribute information area 601 of each image using a display scale setting set for the image in the UI of FIG. 11, the image is transmitted.

Assume that a transmission destination is a server designated in the transmission destination edit box. Assume also that simultaneously with receiving an image from a personal computer, the server distributes the image. Then, the client controls an image file received from the server according to the display scale information of the image file.

Image Playback Processing

Figure 12B:
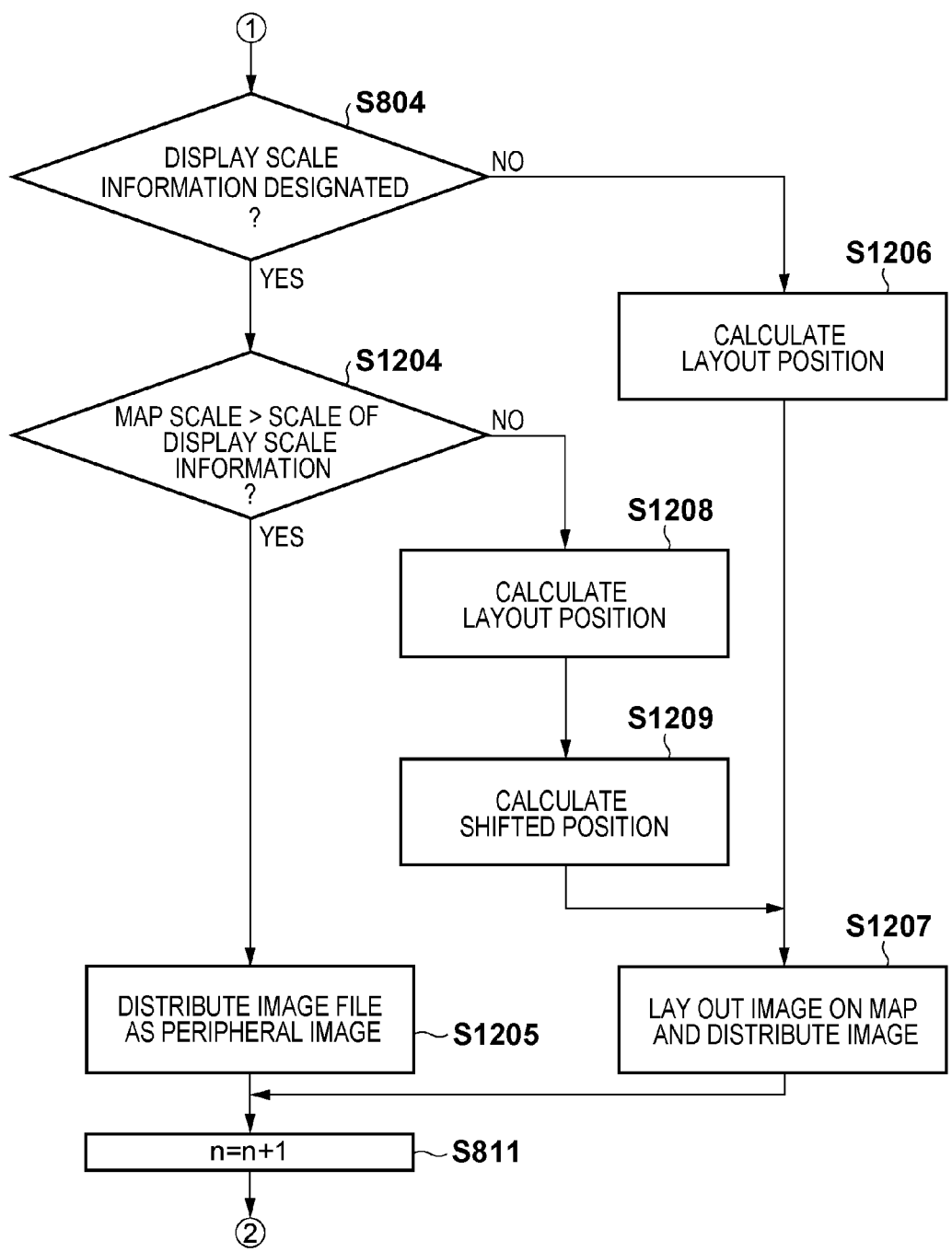

Processing of controlling based on display scale information whether to lay out an image on a map and playing back the image by the client serving as an image control apparatus according to the second embodiment will be described with reference to FIGS. 12A and 12B. Note that this processing is executed when the CPU 501 executes a control program stored in a RAM 503.

The following description will be concentrated on image control processing, and a description of processing of receiving data from the server will be omitted. Assume that the CPU 501 of the client receives, in advance, at a network interface 508 via a computer network 511, an image file distributed from the server, and holds it in the HDD 505. It is not described in detail how images distributed from the server are selected, but it is assumed in this embodiment that arbitrarily selecting condition is transmitted from the client. The present invention is not limited to the manner. It may be assumed that the plurality of images, which are included in a specified album managed by the server, are selected as targets to be distributed as a whole.

Referring to FIGS. 12 A and 12B, the same reference symbols are given to the same processes as those in FIG. 8, and a description thereof will be omitted. A CPU 401 in FIG. 8 corresponds to the CPU 501 in FIGS. 12 A and 12B, a RAM 403 corresponds to the RAM 503, and an HDD 405 corresponds to the HDD 505.

Referring to FIGS. 12 A and 12B, in step S1201, the CPU 501 determines a scale of a map to be displayed by default. In this embodiment, for all image files stored in the HDD 505 as targets to be displayed, the CPU 501 refers to the display scale information of the Exif_MakerNote attribute information area 601 and selects a lowest scale among scales indicated by the display scale information. The display scale may be designated by the user using the operation member 904 in step S1201.

In step S1202, the CPU 501 determines a map range to be displayed by default. In this embodiment, the CPU 501 determines a map display range so as to contain a place where all of the shooting locations of the image files stored in the HDD 505 concentrate. The map scale and/or display range is variable by the user operation in step S1210 described later after the images are displayed in the display condition by default determined in steps S1201 and S1202.

In step S1212, the CPU 501 transmits the map scale determined in step S1201 and display range determined in step S1202 to the server and requests, of the server which holds map information, corresponding to map data via the computer network 511. The CPU 501 receives the map data transmitted from the server in response to the request.

In step S1203, the CPU 501 extracts an image whose shooting location falls within the range of latitude and longitude of the display range. For all the image files stored in the HDD 505, the CPU 501 refers to the shooting location information of the Exif_Base attribute information area 600. If the information is encrypted, the CPU 501 decrypts the information. The CPU 501 determines and extracts, as a target, an image whose shooting location information falls within the prescribed range of latitude and longitude. Note that the shooting location information decrypted in step S1203 is not displayed. This is done to make it impossible for a viewer to know a detailed shooting location.

In step S1204, the CPU 501 determines whether the scale designated by the user is higher than a scale indicated by the display scale information acquired in step S804.

If the CPU 501 determines in step S1204 that the scale of the client is higher than the scale indicated by the display scale information, the process advances to step S1205.

If the CPU 501 determines in step S1204 that the scale of the client is equal to or lower than the scale indicated by the display scale information, the process advances to step S1208.

In step S1205, the CPU 501 displays the image file as a peripheral image. In this case, the image file is displayed on an area other than the map without superposing the image on the map. Therefore, it is impossible for the viewer to discriminate the shooting location on the map but it is possible to discriminate somewhere the image has been shot in the displayed map.

In step S1206, the CPU 501 calculates the layout position of the image on the map. A method of calculating the layout position is as described with reference to equations (3) and (4).

In step S1207, the CPU 501 displays a reduced image in association with the shooting location on the map. At this time, the CPU 501 displays the image so that the layout position calculated in step S1206 or S1209 is placed at the center of the reduced image.

In step S1208, the CPU 501 calculates the layout position of the image on the map similarly to step S1206.

In step S1209, the CPU 501 calculates a position shifted from the layout position calculated in step S1208. A method of calculating a shifted position will be described later.

In step S1210, the CPU 501 determines whether the display conditions have been changed. A method of changing the display conditions will be described later.

If the CPU 501 determines in step S1210 that the display conditions have been changed, the process returns to step S1201.

If the CPU 501 determines in step S1210 that the display conditions have not been changed, the process advances to step S1211.

In step S1211, the CPU 501 determines whether the user has instructed to end the processing. A method in which the user instructs to end the processing will be described later.

If the CPU 501 determines in step S1211 that the user has instructed to end the processing, it ends the series of processes.

If the CPU 501 determines in step S1211 that the user has not instructed to end the processing, the process returns to step S1210.

Method of Calculating Shifted Position

A method of calculating the coordinates (newShotX, newShotY) of a shifted position in step S1209 will be explained by assuming that variables respectively assume the following values. Coordinates in the map display area are defined by considering the abscissa as the X-axis, the ordinate as the Y-axis, and a point 901 as an origin.

shotX: an X coordinate (pixel) calculated in step S1208
shotY: a Y coordinate (pixel) calculated in step S1208
newShotX: the X coordinate (pixel) of a shifted position
newShotY: the Y coordinates (pixel) of the shifted position
thumbWidth: the width (pixel) of a reduced image
thumHeight: the height (pixel) of the reduced image . . . (8)

Let rand( ) be a random number and % be a remainder. Then, a method of calculating the coordinates of a shifted position is represented by $$newShotX = shotX + rand(\ )\% \; thumbWidth - thumbWidth \quad (9)$$

$$newShotY = shotY + rand(\ )\% \; thumbHeight - thumbHeight \quad (10)$$

Transition of User Interface

The user interface of the client serving as an image control apparatus will be explained with reference to FIGS. 13 and 14.

Figure 13:
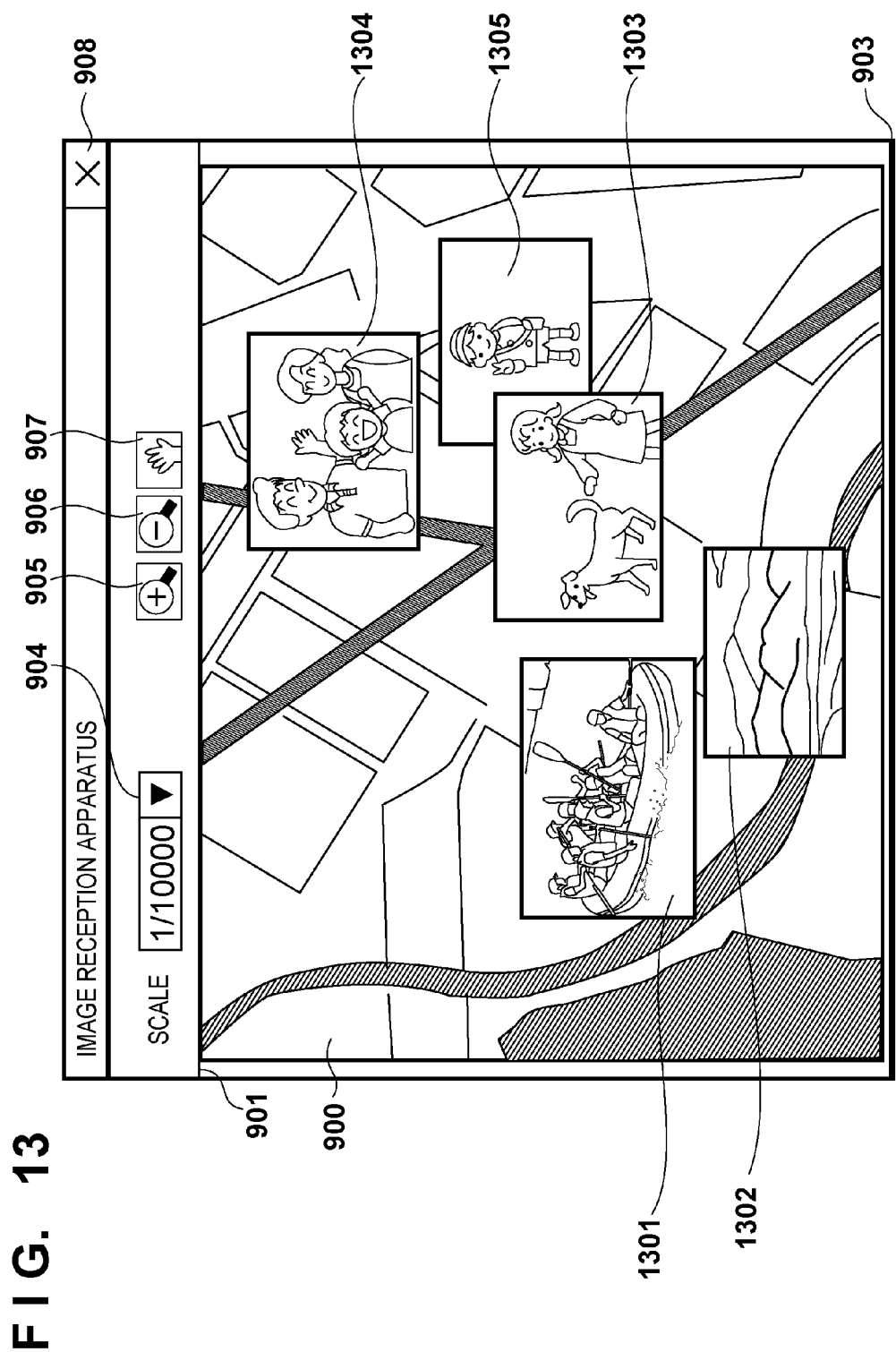
FIG. 13 is a view showing a user interface example on the image reception apparatus side according to the second embodiment.
Figure 14:
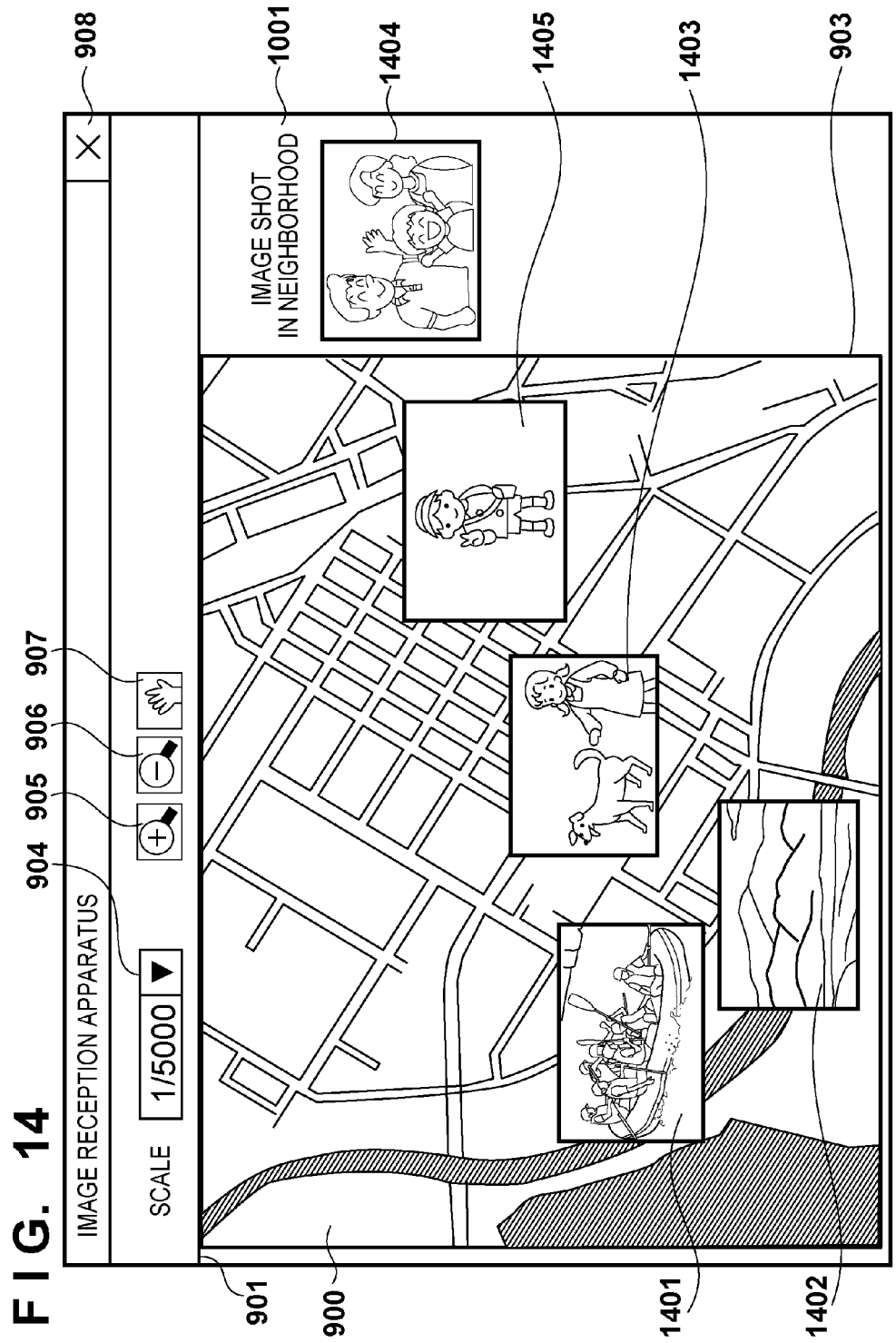
FIG. 14 is a view showing a user interface example on the image reception apparatus side according to the second embodiment.

Referring to FIGS. 13 and 14, the same reference numerals are given to the same operation members as those in FIG. 9, and a description thereof will be omitted. FIGS. 13 and 14 each show a case in which a viewer downloads, to the client via the computer network, an image distributed from the server, and views the image. In the first embodiment, every time the display conditions are changed by operating operation members 904 to 907, the changed display conditions are transmitted to the server. In the second embodiment, however, since the client performs image control processing, the RAM 503 holds the display conditions, and the CPU 501 loads the display conditions from the RAM 503, and uses them when necessary for control.

Reference numerals 1301 to 1305 denote reduced images of images distributed from the server. Assume that the display scale information received from the server of the image 1301 or 1302; a value of 0, that of the image 1303; a value of 5000, that of the image 1304; a value of 10000, and that of the image 1305; a value of 2000 are designated, respectively. In this case, transition of the user interface will be described with reference to FIGS. 12A and 12B. To explain how the processing changes for each image, processing in steps S813, S804, and S1204 to S1209 will be described.

Assume that a map ranges shown in FIG. 13 from a latitude of 43° 45' and a longitude of 142° 25' to a latitude of 43° 25' and a longitude of 142° 45', and the map scale is 1/10000.

A case in which a target image is the image 1301 will be explained.

In step S813, the CPU 501 loads, as a target file, the image 1301 from the HDD 505 into the RAM 503.

The CPU 501 determines in step S804 that display scale information has not been set for the image 1301, and the process advances to step S1206.

In step S1206, the CPU 501 calculates the layout position of the image 1301. A calculation method is as described using equations (3) and (4).

In step S1207, the CPU 501 lays out the image so that the layout position calculated in step S1206 is placed at the center of the reduced image.

The same processing is also performed for the image 1302, since display scale information has not been set like the image 1301.

A case in which a target image is the image 1303 will be explained.

In step S813, the CPU 501 loads, as a target file, the image 1303 from the HDD 405 into the RAM 403.

The CPU 501 determines in step S804 that display scale information has been set for the image 1303, and the process advances to step S1204.

In step S1204, the CPU 501 determines whether a map scale set in the map scale setting box 904 is higher than a scale indicated by the display scale information acquired in step S804. Since the map scale is 1/10000 and the scale indicated by the display scale information of the image 1303 is 1/5000, the CPU 501 determines that the map scale is lower, and the process advances to step S1208.

In step S1208, the CPU 501 calculates a layout position similarly to step S1206.

In step S1209, the CPU 501 calculates a shifted position. A calculation method is as described using equations (9) and (10).

In step S1207, the CPU 501 lays out the image so that the layout position calculated in step S1209 is placed at the center of the reduced image.

For the image 1304 or 1305, since the CPU 501 determines in step S1204 that the map scale is equal to or lower than a scale indicated by display scale information, the same processing as that for the image 1303 is performed.

If the map scale is 1/10000, the user interface transits to the state shown in FIG. 13 with the above-described processing.

A case in which the map ranges from a latitude of 43° 4' and a longitude of 142° 3' to a latitude of 43° 3' and a longitude of 142° 4' and the map scale is changed to 1/5000 will be described.

For the image 1301 or 1302, the same processing as that when the map scale is 1/10000 is performed, and a description thereof will be omitted.

A case in which a target image is the image 1303 will be explained.

In step S813, the CPU 501 loads, as a target file, the image 1303 from the HDD 405 into the RAM 403.

The CPU 501 determines in step S804 that display scale information has been set for the image 1303, and the process advances to step S1204.

In step S1204, the CPU 501 determines whether the map scale set in the map scale setting box 904 is higher than a scale indicated by the display scale information acquired in step S804. Since the map scale is 1/5000 and the scale indicated by the display scale information of the image 1303 is 1/5000, the CPU 501 determines that the map scale is equal to the scale indicated by the display scale information, and the process advances to step S1208.

In step S1208, the CPU 501 calculates the layout position of the image 1303. A calculation method is as described using equations (3) and (4).

In step S1209, the CPU 501 calculates a shifted position. A calculation method is as described using equations (9) and (10).

In step S1207, the CPU 501 lays out the image so that the layout position calculated in step S1209 is placed at the center of the reduced image.

For the image 1305, since the CPU 501 determines in step S1204 that the scale designated by the user is equal to or lower than a scale indicated by display scale information, the same processing as that for the image 1303 is performed.

A case in which a target image is the image 1304 will be described.

In step S813, the CPU 501 loads, as a target file, the image 1304 from the HDD 405 into the RAM 403.

The CPU 501 determines in step S804 that display scale information has been set for the image 1304, and the process advances to step S1204.

In step S1204, the CPU 501 determines whether the map scale set in the map scale setting box 904 is higher than a scale indicated by the display scale information acquired in step S804. Since the map scale is 1/5000 and the scale indicated by the display scale information of the image 1304 is 1/10000, the CPU 501 determines that the map scale is higher, and the process advances to step S1205.

In step S1205, the CPU 501 displays the image file as a peripheral image.

If the map scale is 1/5000, the user interface transits to the state shown in FIG. 14 with the above-described processing.

The images 1301, 1302, 1303, 1304, and 1305 of FIG. 13 correspond to images 1401, 1402, 1403, 1404, and 1405, respectively.

Modification of Display Method when Scale is High

A case in which an image is displayed in the peripheral image display area 1001 of FIG. 10 or 14 in step S1205 has been explained. However, an image itself need not be displayed since the image need only be displayed not in association with its shooting location. A reduced image may be displayed while changing, for each re-rendering operation, the display position of the reduced image within the map display area 900 of FIG. 10 or 14, or may be displayed while changing the display position at a given interval.

As described above, according to this embodiment, an image is first laid out and displayed on a map with a lowest one of scales indicated by display scale information of the image. With this processing, a viewer can recognize an approximate location of the image.

Even if the scale is changed, it is possible to display an image so as to be able to discriminate its approximate shooting location while protecting privacy of a photographer. Furthermore, since the shooting location information of an image file is encrypted and then distributed, a viewer cannot readily know a detailed shooting location by analyzing attribute information.

Even if a map scale is lower than a scale indicated by display scale information, it is possible to prevent a viewer from specifying a detailed shooting location by displaying the image at a shifted position so that the shooting location is not placed at the center of the image.

In the above embodiment, a case in which the server holds map data has been described. However, the map data may be held in the HDD 505 of the client. In this case, the map data may be read out from the HDD 505 instead of receiving the map data from the server in step S1212. Further, in the present invention, the map data is received from the server which distributes the image data, but the map data may be received from a server other than the server which distributes the image data.

Third Embodiment

In the first and second embodiments, whether to lay out and display an image on a map is switched depending on a scale. In the third embodiment, however, a case in which a map accuracy and an area are designated and whether to lay out and display an image on a map is switched depending on the map accuracy will be described. The map accuracy according to this embodiment indicates the level of an administrative area such as a town, ward, city, prefecture, region, or country. Among the administrative area, the map accuracy of the town is the highest and the map scale to be displayed is the largest. The map accuracy becomes lower and the map scale to be displayed is smaller in accordance with the ward, city, prefecture, region, or country. The map accuracy of the country is the lowest and the map scale to be displayed is the smallest. In the third embodiment, a server serves as an image control apparatus, and a personal computer serves as an image transmission apparatus. The configuration of the image control apparatus is the same as that of the server in the first embodiment. The configuration of the image transmission apparatus is the same as that of the client in the first embodiment.

Map Accuracy Designation

Figure 15:
FIG. 15 is a user interface example on the image transmission apparatus side according to the third embodiment.

FIG. 15 shows a user interface example in the image transmission apparatus according to this embodiment, and shows a state in which a photographer views images which have not been distributed. The same reference numerals are given to the same operation members as those in FIG. 11 described above, and a description thereof will be omitted.

Referring to FIG. 15, reference numeral 1501 denotes a map accuracy setting box. When the user presses a down arrow button of the map accuracy setting box, a CPU 501 determines that the user has performed a setting changing operation, and displays a pull-down menu. In this case, displayed menu items are "country", "region", "prefecture", "city", "ward", and "town". When the user selects one of the items of the pull-down menu, the CPU 501 determines that the user has selected a setting, and closes the pull-down menu. Then, the CPU 501 displays the selected accuracy in the map accuracy setting box 1501.

Image transmission processing is as described with reference to FIG. 7 in the first embodiment. Although display scale information is loaded in step S705 in the first embodiment, map accuracy information is loaded in the third embodiment. Furthermore, although the display scale information of a target image is changed in step S706 in the first embodiment, the map accuracy information of a target image is changed in the third embodiment. A numerical value corresponding to an item is written in the map accuracy information. "6" is written for "town", "5" is written for "ward", "4" is written for "city", "3" is written for "prefecture", "2" is written for "region", and "1" is written for "country".

Image Playback Processing

Processing of controlling based on map accuracy information whether to lay out an image on a map, and playing back the image in the server serving as an image control apparatus according to this embodiment will be described with reference to FIG. 16. Note that this processing is executed when a CPU 401 executes a control program stored in a RAM 403. Assume that the CPU 401 of the server receives, in advance, at a network interface 408 via a computer network 411, an image file transmitted from the personal computer, and holds it in an HDD 405. Assume also that a state in which it is possible to bidirectionally transmit/receive data has been established between the server and the client.

Figure 16:
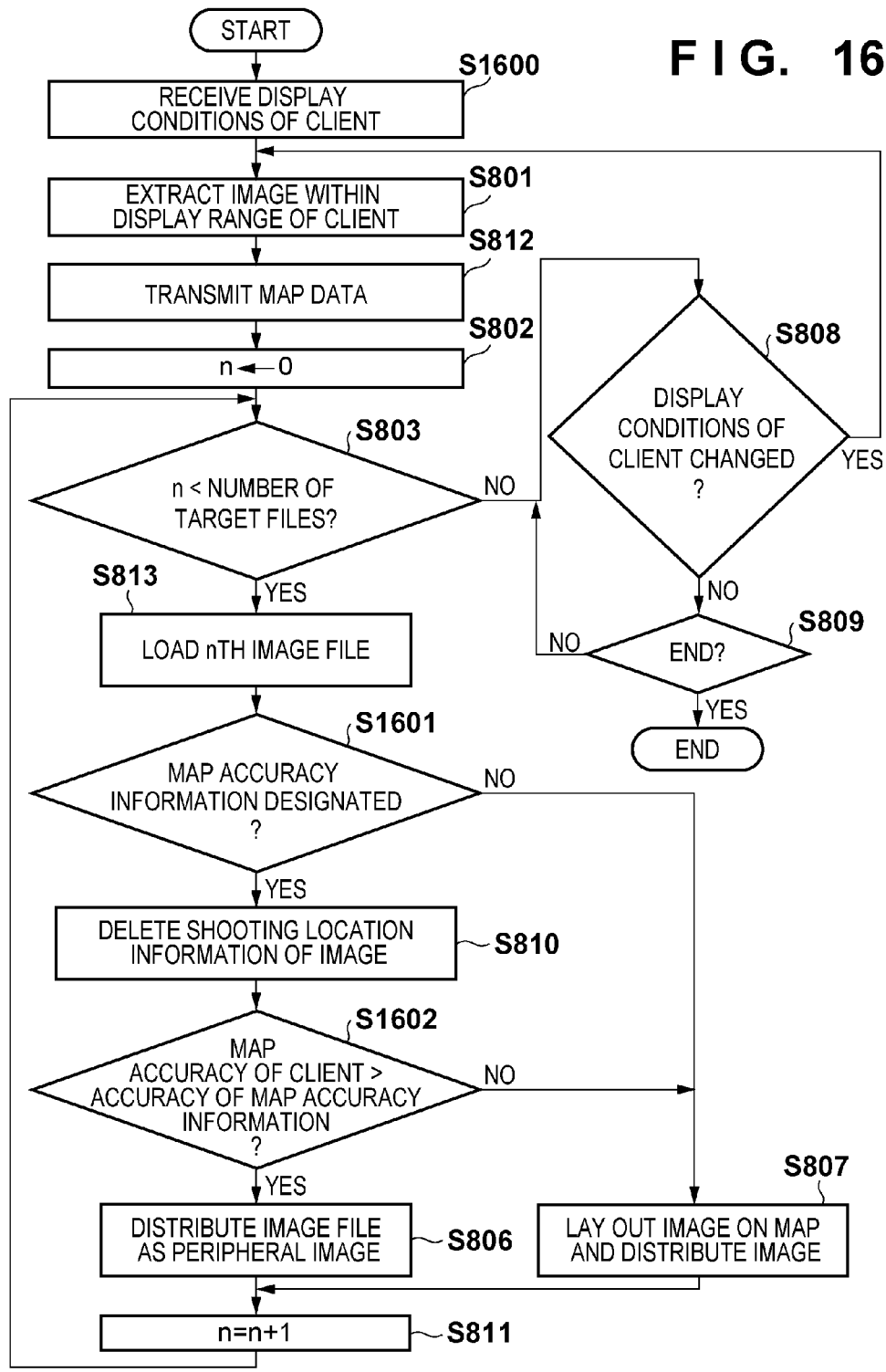
FIG. 16 is a flowchart illustrating image control processing according to the third embodiment.

Referring to FIG. 16, the same reference symbols are given to the same processes as those in FIG. 8 described above, and a description thereof will be omitted.

Referring to FIG. 16, in step S1600, the CPU 401 receives the display conditions of the client at the network interface 408 via the computer network 411. The display conditions include a range of latitude and longitude and an accuracy of a map to be displayed in the client. Assume that the map accuracy represented by a numerical value corresponding to an item is received. "6" is received for "town", "5" is received for "ward", "4" is received for "city", "3" is received for "prefecture", "2" is received for "region", and "1" is received for "country".

In step S1601, the CPU 401 determines whether the map accuracy information of an Exif_MakerNote attribute information area 601 has been designated for a target file to be displayed. If the map accuracy information has a value of 0, it is determined that the map accuracy information has not been set. If the map accuracy information has a value of 1 or larger, it is determined that the map accuracy information has been designated.

In step S1602, the CPU 401 determines whether the map accuracy of the client received in step S1600 is higher than an accuracy indicated by the map accuracy information acquired in step S1601.

If the CPU 401 determines in step S1602 that the map accuracy of the client is larger than the value of the map accuracy information, the process advances to step S806.

If the CPU 401 determines in step S1602 that the map accuracy of the client is equal to or smaller than the value of the map accuracy information, the process advances to step S807.

Transition of User Interface

The user interface of the client serving as an image reception apparatus according the third embodiment will be described with reference to FIGS. 17 and 18.

Figure 17:
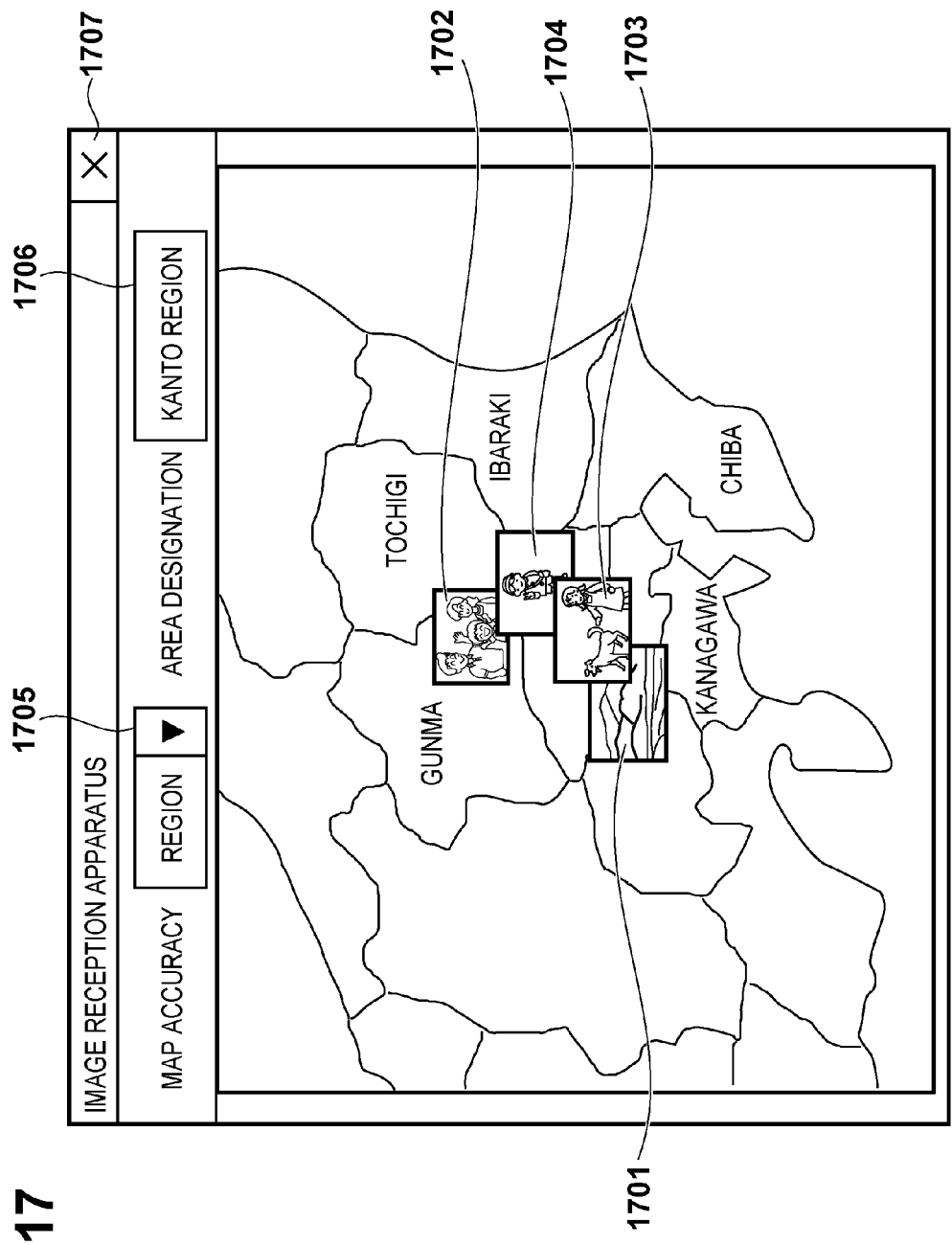
FIG. 17 is a view showing a user interface example on the image reception apparatus side according to the third embodiment.
Figure 18:
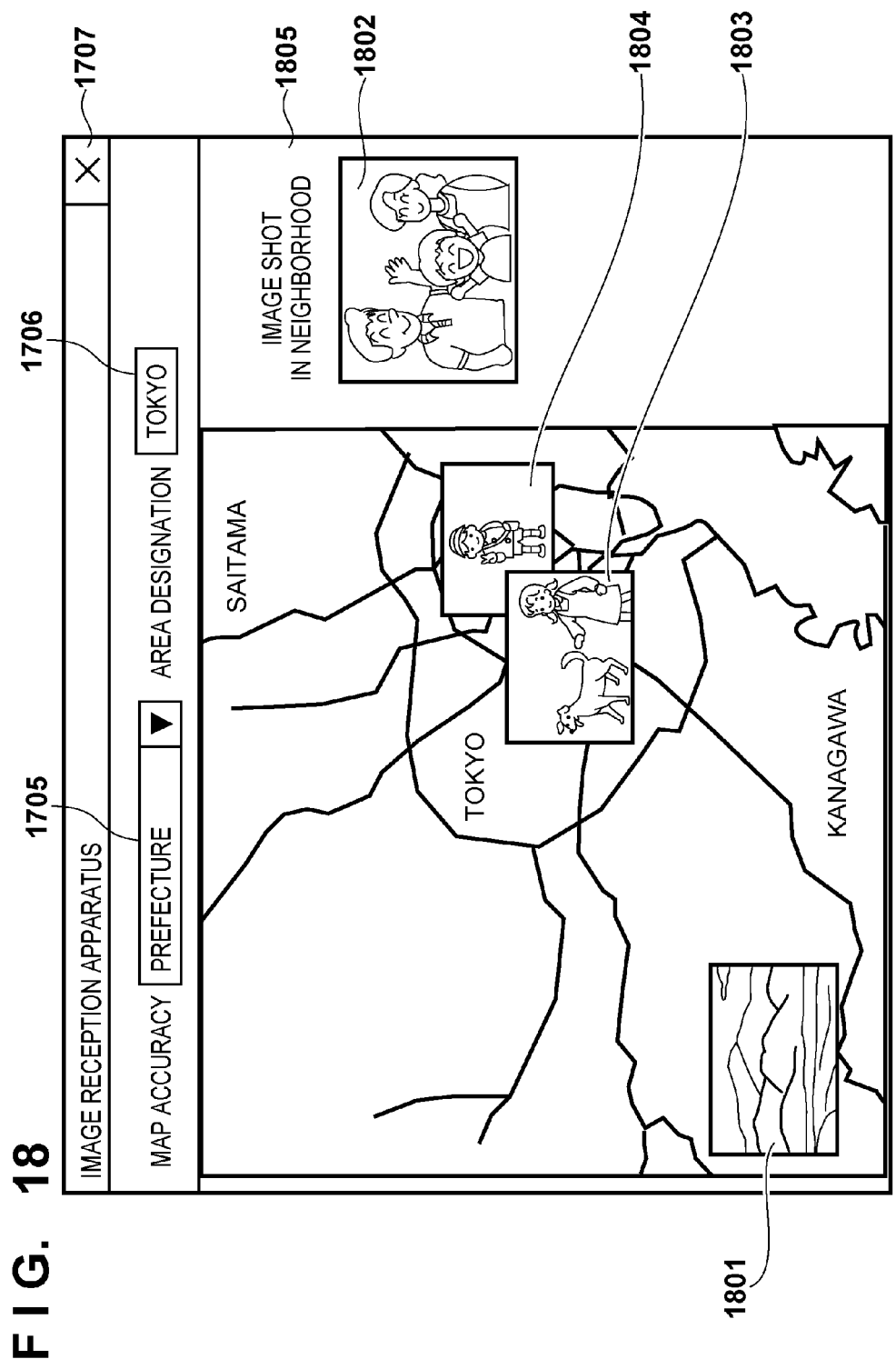
FIG. 18 is a view showing a user interface example on the image reception apparatus side according to the third embodiment.

The same reference numerals are given to the same operation members in FIGS. 17 and 18, and a description thereof will be omitted. FIGS. 17 and 18 each show a case in which a viewer downloads, to the client via the computer network, an image distributed by a photographer in the server, and views the image.

Referring to FIG. 17, reference numeral 1705 denotes a map accuracy setting box for designating a map accuracy. When the user selects and presses a down arrow button on the right of the map accuracy setting box, the CPU 501 determines that the user has performed a setting changing operation, and displays a pull-down menu. In this case, displayed menu items are "town", "ward", "city", "prefecture", "region", and "country". When the user selects one of the items of the pull-down menu, the CPU 501 determines that the user has selected a setting, and closes the pull-down menu. The CPU 501 displays the selected accuracy in the map accuracy setting box 1705.

Reference numeral 1706 denotes an area setting edit box for designating an area. When the user selects the area setting edit box 1706 using a pointing device such as a mouse, it is possible to input a character string. If the user switches to select another operation member after inputting an area name using an input device such as a keyboard, the CPU 501 determines that the user has completed a character string input operation, and displays the input character string in the area setting edit box 1706.

Reference numeral 1707 denotes an end button whose function is the same as that of the end button 908 in FIG. 9.

Reference numerals 1701 to 1704 denote reduced images of images distributed from the server.

Assume that map accuracy information set for the image 1701 has a value of 0, that set for the image 1702 has a value of 2, that set for the image 1703 has a value of 5, and that set for the image 1704 has a value of 6. In this case, transition of the UI will be described with reference to FIG. 16.

To explain how the processing changes for each image, processing in steps S1601, S1602, S810, S807, and S806 will be described.

A case in which a map ranges from a latitude of 37° and a longitude of 136° to a latitude of 34° and a longitude of 142° and the map accuracy is "region" will be explained. The value of the map accuracy is 2 corresponding to "region".

A case in which a target image is the image 1701 will be explained.

The CPU 401 determines in step S1601 that map accuracy information has not been set for the image 1701, and the process advances to step S807.

In step S807, the CPU 401 associates the image with an image layout position on the map, and distributes the image file in the RAM 403 to the client via the computer network 411. A method of calculating the layout position is as described using equations (3) and (4).

A case in which a target image is the image 1702 will be described.

The CPU 401 determines in step S1601 that map accuracy information has been set for the image 1702, and the process advances to step S810.

In step S810, the CPU 401 deletes shooting location information in the Exif_Base attribute information area 600 of the image file in the RAM 403.

In step S1602, the CPU 401 determines whether the value of the map accuracy of the client is larger than that of the map accuracy information acquired in step S1601. Since the value of the map accuracy is 2 and the value of the map accuracy information of the image 1701 is also 2, the CPU 401 determines that the values are equal to each other, and the process advances to step S807.

In step S807, the CPU 401 associates the image with an image layout position on the map, and distributes the image file in the RAM 403 to the client via the computer network 411. A method of calculating the layout position is as described using equations (3) and (4).

For the image 1703 or 1704, since it is determined in step S1602 that the value of the map accuracy information of the image is larger than that of the map accuracy, the same processing as that for the image 1702 is performed.

If the map accuracy is "region", the user interface transits to the state shown in FIG. 17 with the above-described processing.

A case in which the map ranges from a latitude of 34° and a longitude of 139° 2' to a latitude of 35° 3' and a longitude of 139° 8' and the map accuracy is changed to "prefecture" will be explained. The value of the map accuracy is 3 corresponding to "prefecture".

For the image 1701, the same processing as that when the map accuracy is "region" is performed when the map accuracy is "prefecture", and a description thereof will be omitted.

A case in which a target image is the image 1702 will be described.

The CPU 401 determines in step S1601 that map accuracy information has been set for the image 1702, and the process advances to step S810.

In step S810, the CPU 401 deletes shooting location information in the Exif_Base attribute information area 600 of the image file in the RAM 403.

In step S1602, the CPU 401 determines whether the value of the map accuracy of the client is larger than that of the map accuracy information acquired in step S1601. Since the value of the map accuracy is 3 and the value of the map accuracy information of the image 1702 is 2, the CPU 401 determines that the value of the map accuracy is larger than that of the map accuracy information, and the process advances to step S806.

In step S806, the CPU 401 distributes, as a peripheral image, the image file in the RAM 403 to the client via the computer network 411.

A case in which a target image is the image 1703 will be explained.

The CPU 401 determines in step S1601 that map accuracy information has been set for the image 1703, and the process advances to step S810.

In step S810, the CPU 401 deletes shooting location information in the Exif_Base attribute information area 600 of the image file in the RAM 403.

In step S1602, the CPU 401 determines whether the value of the map accuracy of the client is larger than that of the map accuracy information acquired in step S1601. Since the value of the map accuracy is 3 and the value of the map accuracy information of the image 1703 is 5, the CPU 401 determines that the value of the map accuracy is smaller than that of the map accuracy information, and the process advances to step S807.

In step S807, the CPU 401 associates the image with an image layout position on the map, and distributes the image file in the RAM 403 to the client via the computer network 411. A method of calculating the layout position is as described using equations (3) and (4).

For the image 1704, since it is determined in step S1602 that the value of the map accuracy information of the image is larger than that of the map accuracy, the same processing as that for the image 1703 is performed.

If the map accuracy is "prefecture", the user interface transits to the state shown in FIG. 18 with the above-described processing. The images 1701, 1702, 1703, and 1704 of FIG. 17 correspond to images 1801, 1802, 1803, and 1804, respectively.

Referring to FIG. 18, reference numeral 1805 denotes a peripheral image display area whose function is the same as that of the peripheral image display area 1001.

As described above, according to this embodiment, it is possible to distribute an image so as to be able to discriminate its approximate shooting location while protecting the privacy of a photographer.

In the above embodiment, a case in which the server serving as an image control apparatus holds map data has been described. For example, however, like an online album site, a map data service for providing map data may be notified of a display range, a scale, and the like, thereby acquiring the map data.

Other Embodiments

The present invention can also be implemented by executing the following processing. That is, software (program codes) for implementing the functions of the above-described embodiments is supplied to a system or apparatus via a network or various kinds of storage media, and the computer (or the CPU or MPU) of the system or apparatus reads out and executes the program codes. In this case, the program codes and the storage medium storing the program codes constitute the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-279874, filed Dec. 15, 2010, which is hereby incorporated by reference herein in its entirety.

What is claimed is:

1. An image control apparatus, comprising:
an acquisition unit configured to acquire position information from attribute information of the image;
a setting unit configured to set a display scale of a map when displaying the image on the map; and
a generation unit configured to generate display data for displaying the map and the image on a display device using the position information acquired by said acquisition unit and the display scale set by said setting unit,
wherein when the display scale of the map set by said setting unit is lower than a predetermined scale, said generation unit generates display data in which the image is laid out at a position corresponding to the position information on the map, and when the display scale of the map is higher than the predetermined scale, said generation unit generates display data in which the image and the map are laid out without laying out the image on the map.

2. The apparatus according to claim 1, wherein the display scale of the map changes in accordance with an administrative area.

3. The apparatus according to claim 1, wherein restriction information designating the largest scale of the map on which the image may be displayed is set to each image file, and said generation unit generates the display data by comparing the restriction information set in each image file and the user designated display scale of the map.

4. The apparatus according to claim 1, wherein when the display scale of the map is higher than the predetermined scale, said generation unit generates display data in which the image is laid out outside the display area of the map without laying out the image on the map.

5. The apparatus according to claim 1, wherein when the display scale set by said setting unit is equal or lower than the predetermined scale, said generation unit generates display data in which the center of the image is shifted from the position corresponding to the position information acquired by said acquisition unit.

6. The apparatus according to claim 1, wherein the image is image data received from an image capturing apparatus, and the position information is shooting location information of the image.

7. The apparatus according to claim 6, wherein the image data contains information which permit to lay out the image at the position corresponding to the position information on the map.

8. The apparatus according to claim 7, further comprising distribution unit for distributing the display data generated by said generation unit to an information processing apparatus having display device.

9. The apparatus according to claim 8, wherein said distribution unit distributes the display data from which the position information of the image to be included in the display data is deleted.

10. The apparatus according to claim 1, wherein said image control apparatus acquires map data from a server which provides map data by designating a display accuracy of the map.

11. A control method of a display control apparatus, the control method implemented by a processor and comprising:
implementing, via the processor, an acquisition step of acquiring position information from attribute information of the image;
implementing, via the processor, a setting step of setting a display scale of a map when displaying the image on the map; and
implementing, via the processor, a generation step of generating display data for displaying the map and the image on a display device using the position information acquired by said acquisition step and the display scale set by said setting step,
wherein when the display scale of the map set by said setting step is lower than a predetermined scale, in said generation step display data in which the image is laid out at a position corresponding to the position information on the map is generated, and when the display scale of the map is higher than the predetermined scale, display data in which the image and the map are laid out without laying out the image on the map is generated.

12. The control method according to claim 11, wherein the display scale of the map changes in accordance with an administrative area.

13. The control method according to claim 11, wherein restriction information designating the largest scale of the map on which the image may be displayed is set to each image file, and
said generation step generates the display data by comparing the restriction information set in each image file and a user designated display scale of the map.

14. The control method according to claim 11, wherein when the display scale of the map is higher than the predetermined scale, said generation step generates display data in which the image is laid out outside the display area of the map without laying out the image on the map.

15. The control method according to claim 11, wherein the image is image data received from an image capturing apparatus, and the position information is shooting location information of the image.

16. A server which generates display data in which image is laid out on a map and provides the generated display data to a client via a network, comprising:
a storage unit configured to store image and attribute information of the image; and
a processor which implements:
an acquisition unit configured to acquire position information associated with the image from the attribute information stored in said storage unit;
a reception unit configured to receive a designation of a map scale when the image is displayed; and
a generation unit configured to generate display data of the map and image using the position information acquired by said acquisition unit and the map scale received by said reception unit,
wherein when the map scale received by said reception unit is smaller than a predetermined map scale, the display data is data in which the image is laid out at a position corresponding to the position information on the map, and when the map scale is larger than the predetermined map scale, the display data is data in which the image is not laid out at the position corresponding to the position information on the map.

17. The server according to claim 16, wherein when the map scale is larger than the predetermined map scale, said generation unit generates display data in which the image is laid out outside the display area of the map without laying out the image on the map.

18. The server according to claim 16, further comprising a communication unit configured to communicate with the client and transmit the display data generated by said generation unit to the client,
wherein said communication unit transmits the display data from which the position information of the image to be included in the display data is deleted.

19. The server according to claim 16, wherein said server acquires map data from a server which provides map data by designating a map scale, and
said generation unit generates display data by combining the map data acquired from the server and image data stored in said storage unit and transmits the generated display data to the client.

20. A control method of a server which generates display data in which image is laid out on a map and provides the generated display data to a client via a network, the control method implemented by a processor and comprising:
implementing, via the processor, a storage step of storing image and attribute information of the image;
implementing, via the processor, an acquisition step of acquiring position information associated with the image from the attribute information stored in said storage step;
implementing, via the processor, a reception step of receiving a designation of a map scale when the image is displayed; and
implementing, via the processor, a generation step of generating display data of the map and image using the position information acquired by said acquisition step and the map scale received by said reception step, wherein when the map scale received by said reception step is smaller than a predetermined map scale, the display data is data in which the image is laid out at a position corresponding to the position information on the map, and when the map scale is larger than the predetermined map scale, the display data is data in which the image is not laid out at the position corresponding to the position information on the map.

21. The control method according to claim 20, wherein the map scale changes in accordance with an administrative area.

22. The control method according to claim 20, wherein restriction information designating the largest scale of the map on which the image may be displayed is set to each image file, and said generation step generates the display data by comparing the restriction information set in each image file and a user designated map scale.

23. The control method according to claim 20, wherein when the map scale is higher than the predetermined map scale, said generation step generates display data in which the image is laid out outside the display area of the map without laying out the image on the map.

24. The control method according to claim 20, wherein the image is image data received from an image capturing apparatus, and the position information is shooting location information of the image.

* * * * *